(12) United States Patent
Homer et al.

(10) Patent No.: US 7,701,976 B2
(45) Date of Patent: Apr. 20, 2010

(54) COMMUNICATIONS SYSTEM WITH SEGMENTING AND FRAMING OF SEGMENTS

(75) Inventors: Russell Homer, Los Gatos, CA (US); Khai Hoan Duong, Milpitas, CA (US)

(73) Assignee: Exar Corporation, Fremont, CA (US)

(*) Notice: Subject to any disclaimer, the term of this patent is extended or adjusted under 35 U.S.C. 154(b) by 929 days.

(21) Appl. No.: 11/021,520

(22) Filed: Dec. 22, 2004

(65) Prior Publication Data

US 2006/0133421 A1  Jun. 22, 2006

(51) Int. Cl.
*H04J 3/24* (2006.01)
(52) U.S. Cl. .................. 370/474; 370/235; 709/236
(58) Field of Classification Search ................ 370/389, 370/393, 394, 395.2, 395.1, 395.32, 395.42, 370/471, 474, 412, 417, 718, 419, 429, 235, 370/395.52, 395.41, 418, 464, 465, 469, 370/395; 709/230, 231, 232, 236
See application file for complete search history.

(56) References Cited

U.S. PATENT DOCUMENTS

| | | | | |
|---|---|---|---|---|
| 5,497,371 A * | 3/1996 | Ellis et al. | | 370/412 |
| 5,537,393 A * | 7/1996 | Shioda et al. | | 370/223 |
| 5,719,858 A * | 2/1998 | Moore | | 370/347 |
| 5,796,735 A * | 8/1998 | Miller et al. | | 370/395.4 |
| 6,519,261 B1 * | 2/2003 | Brueckheimer et al. | | 370/395.52 |
| 6,674,750 B1 | 1/2004 | Castellano | | |
| 6,747,977 B1 * | 6/2004 | Smith et al. | | 370/395.64 |
| 7,042,836 B2 * | 5/2006 | Isonuma et al. | | 370/224 |
| 7,254,112 B2 * | 8/2007 | Cornet et al. | | 370/230 |
| 2002/0041592 A1 * | 4/2002 | Van Der Zee et al. | | 370/389 |
| 2002/0080821 A1 | 6/2002 | Hwang | | |
| 2003/0021287 A1 | 1/2003 | Lee et al. | | |
| 2003/0227943 A1 | 12/2003 | Hallman et al. | | |
| 2004/0047367 A1 | 3/2004 | Mammen | | |
| 2004/0062278 A1 | 4/2004 | Hadzic et al. | | |
| 2004/0170166 A1 * | 9/2004 | Cohen | | 370/389 |
| 2004/0170173 A1 | 9/2004 | Pan et al. | | |
| 2004/0179836 A1 * | 9/2004 | Yamaguchi et al. | | 398/5 |
| 2004/0190548 A1 | 9/2004 | Harel et al. | | |
| 2004/0252717 A1 | 12/2004 | Solomon et al. | | |
| 2005/0270977 A1 * | 12/2005 | King et al. | | 370/235 |
| 2005/0281196 A1 * | 12/2005 | Tornetta et al. | | 370/235 |

* cited by examiner

*Primary Examiner*—Jason E Mattis
*Assistant Examiner*—Dady Chery
(74) *Attorney, Agent, or Firm*—Townsend and Townsend and Crew LLP

(57) ABSTRACT

A communications system comprising a segmenting mechanism configured to receive a plurality of payloads and divide each of the received payloads into segments, a framing mechanism configured to insert at least one of the segments from each of the plurality of payloads into a packet, a first interface configured to transmit the packet, and a second interface configured to transmit segment information about the segments in the packet.

25 Claims, 9 Drawing Sheets

COMMUNICATIONS SYSTEM WITH SEGMENTING AND FRAMING OF SEGMENTS

BACKGROUND

Computer system speeds continue to increase and more computer systems are connected to communicate with other computer systems daily. As the volume of digital data communicated between computer systems increases, there is a need to develop higher bandwidth communication links. Often, these communication links are part of a network, such as a local area network (LAN), metro area network (MAN), or a wide area network (WAN).

One network technology, such as Ethernet, employs shared bus technology and carrier sense multiple access with collision detection (CSMA/CD) access. In an Ethernet network, communication links are attached to a cable or optical fiber. The network operates at a particular bandwidth and each communication link transmits only after finding the cable or fiber channel clear. If two communication links transmit simultaneously, a data collision occurs and each of the communication links delays re-transmission for a random length of time. The original Ethernet operated at 10 megabits per second (Mbps). Later versions of Ethernet operate at other speeds, such as 10 gigabits per second (Gbps).

Typically, a communication link is coupled to many computer systems, including microprocessor based systems, application specific integrated circuit (ASIC) based systems, and digital signal processor (DSP) based systems. Each of the computer systems coupled to the communication link does not require the entire bandwidth of the communication link. Instead, the computer systems share the bandwidth of the communication link.

The communication link services each of the computer systems coupled to the communication link. The communication link can service the coupled computer systems in a round robin methodology. In this approach, the communication link services one computer system at a time. All other computer systems coupled to the communication link are serviced before the one computer system is serviced a second time. Thus, with many computer systems coupled to a communication link, the latency between servicing a computer system a first time and a second time can be very large. Also, receive buffers need to be very large to avoid overflow and underflow conditions. Implementing large receive buffers in an integrated circuit chip uses space and adds cost to the chip.

For these and other reasons there is a need for the present invention.

SUMMARY

One aspect of the present invention provides a communications system comprising a segmenting mechanism configured to receive a plurality of payloads and divide each of the received payloads into segments, a framing mechanism configured to insert at least one of the segments from each of the plurality of payloads into a packet, a first interface configured to transmit the packet, and a second interface configured to transmit segment information about the segments in the packet.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
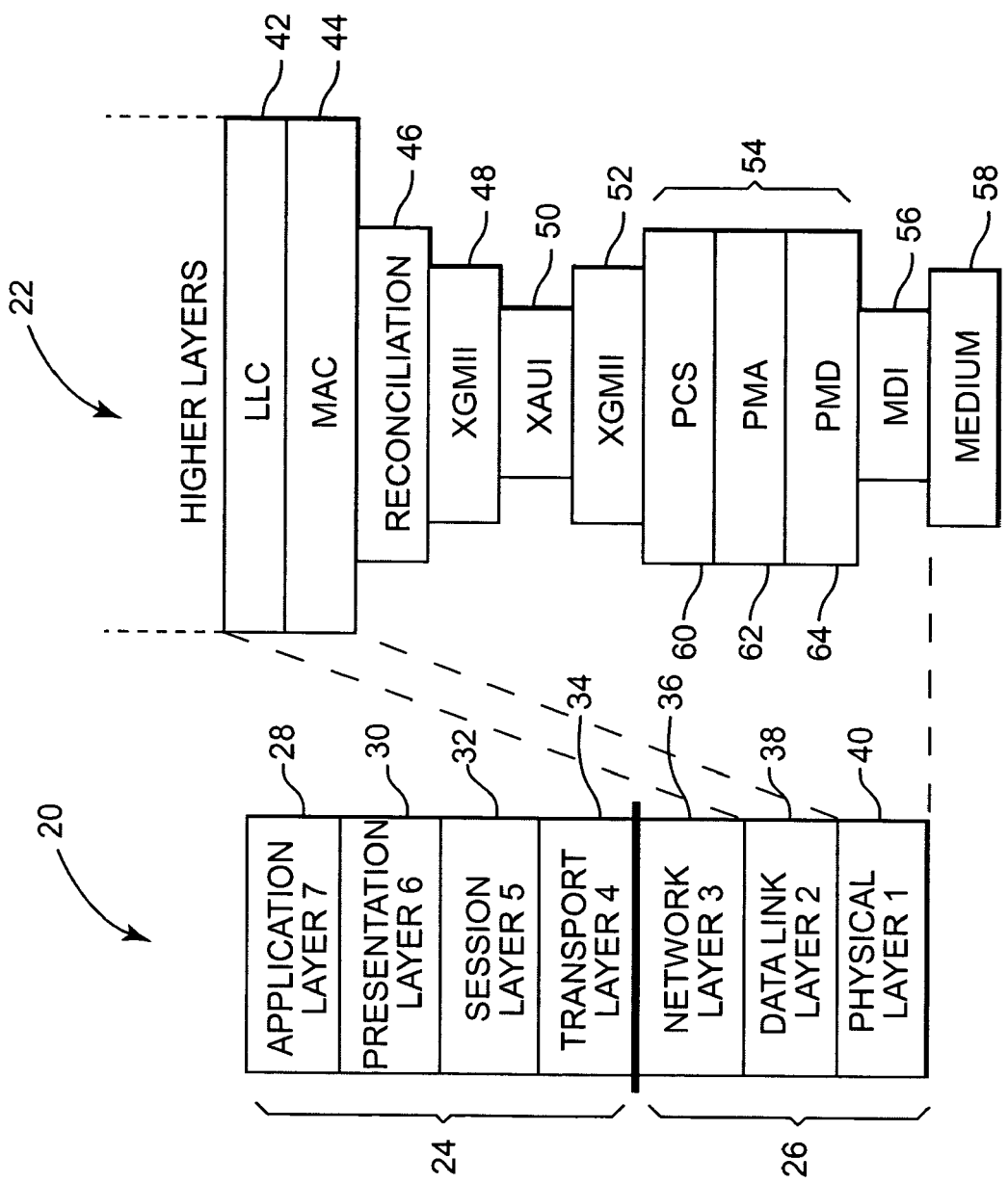
FIG. 1 is a diagram illustrating the Open System Interconnection (OSI) model related to one embodiment of a communication link.

FIG. 1 is a diagram illustrating the Open System Interconnection (OSI) model 20 related to one embodiment of a communication link 22. OSI model 20 is the standard description or reference model that defines a framework for implementing protocols to communicate messages in a communications system. Communication link 22 can be a CSMA/CD communication link that is implemented in any suitable protocol, such as an Ethernet protocol. Communication link 22 operates at 10 Gbps. In other embodiments, communication link 22 can be configured to operate at any suitable bit frequency.

OSI model 20 includes an end user group of layers, indicated at 24, and a networking group of layers, indicated at 26. The end user group of layers 24 passes messages to and from an end user. The networking group of layers 26 passes messages through the host computer system. Messages intended for the host computer system are received by the networking group of layers 26 and passed through the networking group of layers 26 to the end user group of layers 24. Messages destined for another host computer system are not passed to the end user group of layers 24. Instead, messages destined for another host computer system are passed through the networking group of layers 26 to the other host computer system.

The end user group of layers 24 includes application layer 7 at 28, presentation layer 6 at 30, session layer 5 at 32, and transport layer 4 at 34. Application layer 7 at 28 supports application and end user processes. In application layer 7 at 28, communication partners are identified, quality of service is identified, user authentication and privacy are considered, and any constraints on data syntax are identified. Application layer 7 at 28 is not the application itself, but is application specific, and some applications may perform application layer 7 functions. Telnet and file transfer protocol (FTP) are programs that can exist entirely in application layer 7 at 28.

Presentation layer 6 at 30 provides independence from differences in data representation by translating data from application to network format, and vice versa. The presentation layer 6 at 30 transforms data into the form that the application layer can accept and formats and encrypts data to be sent across a network. Presentation layer 6 at 30 is usually part of an operating system and is sometimes called the syntax layer.

Session layer 5 at 32 deals with session and connection coordination. Session layer 5 at 32 establishes, manages, and terminates connections between applications. Session layer 5 at 32 also coordinates conversations, exchanges, and dialogs between the applications.

Transport layer 4 at 34 ensures complete data transfer. Transport layer 4 at 34 provides transparent transfer of data between end systems or hosts, and is responsible for end-to-end error recovery and flow control.

The networking group of layers 26 includes network layer 3 at 36, data link layer 2 at 38, and physical layer 1 at 40. Network layer 3 at 36 provides switching and routing technologies. Network layer 3 at 36 handles the routing of data, sending data in the right direction to the right destination on outgoing transmissions and receiving incoming transmissions. Network layer 3 at 36 handles forwarding, addressing, error handling, congestion control, and packet sequencing.

Data link layer 2 at 38 furnishes transmission protocol knowledge and management. In data link layer 2 at 38, data packets are encoded and decoded into bits. Data link layer 2 at 38 handles errors in the physical layer, flow control, and frame synchronization. Data link layer 2 at 38 includes the logical link control (LLC) layer at 42 and the media access control (MAC) layer at 44. LLC layer 42 controls error checking, flow control, and frame synchronization. MAC layer 44 controls sharing a physical connection among several computer systems, which includes how a computer system gains access to data and permission to transmit data.

Physical layer 1 at 40 conveys a bit stream through the network at the electrical and mechanical level. The bit stream can be conveyed through electrical impulses, radio signals, light, or any suitable transmission technology. Physical layer 1 provides the hardware for sending and receiving data on a carrier, including cables, cards, and other physical aspects. The Ethernet protocol is one protocol with physical layer components.

Communication link 22 can be implemented in data link layer 2 at 38 and physical layer 1 at 40. Communication link 22 includes LLC layer 42 and MAC layer 44, which are part of data link layer 2 at 38. Also, communication link 22 includes a reconciliation sub-layer (RS) 46, a 10 Gbps media independent interface (XGMII) 48, a 10 Gbps attachment unit interface (XAUI) 50, a physical side XGMII 52, a physical layer device 54, and a medium dependent interface (MDI) 56, which are part of physical layer 1 at 40. Each of XGMII 48 and XGMII 52 is one form of a media independent interface (MII) and XAUI 50 is one form of an attachment unit interface (AUI). In other embodiments, the MII, such as XGMII 48 and XGMII 52, and the AUI, such as XAUI 50, can operate at frequencies other than 10 Gbps, such as less than 10 Gbps or more than 10 Gbps.

MDI 56 is attached to a medium 58 to send and receive messages through communication link 22. Medium 58 carries electrical impulses, radio signals, or light from one communication link to another. In one embodiment medium 58 is one or more fiber optic cables. In one embodiment, medium 58 is a twisted pair of copper wires. In other embodiments, medium 58 is any suitable medium for carrying electrical impulses, radio signals, or light.

LLC layer 42 is the upper portion of data link layer 2 at 38. LLC layer 42 controls error checking, flow control, and frame synchronization and presents a uniform interface to the user of the data links service, which is usually network layer 3 at 36. LLC layer 42 enables data link layer 2 at 38 to communicate with the higher layers in a standardized way regardless of the lower layer technology, such as Token Ring, Ethernet, fiber distributed data interface (FDDI), and asynchronous transfer mode (ATM) lower layer technology. MAC layer 44 is situated beneath LLC layer 42.

MAC layer 44 is the lower portion of data link layer 2 at 38 and one of the interface layers between LLC layer 42 and physical layer 1 at 40. MAC layer 44 can be different for different physical media and is responsible for controlling inbound and outbound communications between physical layer 1 at 40 and the higher layers of OSI model 20. MAC layer 44 breaks data into data frames or packets, transmits packets sequentially, processes acknowledgement frames sent back by the receiver, handles address recognition, and controls access to medium 58.

For outbound communications, MAC layer 44 divides the data meant for transmission into a series of packets formatted for physical layer 1 at 40. Within each packet, MAC layer 44 adds a unique layer 2 address, referred to as a MAC address that identifies the computer system sending the transmission. The MAC address can be incorporated in hardware or software. Mac layer 44 also adds the address of the destination computer system. MAC layer 44 organizes the packets sequentially and presents them one at a time to physical layer 1 at 40 for transmission across medium 58. After a destination computer system receives the transmitted packet, the destination computer system sends an acknowledgement frame. The transmitting computer system transmits the next frame in the sequence until all packets are transmitted and confirmed. If an acknowledgement frame is not received after a certain amount of time, the transmitting computer system automatically resends the unacknowledged packet.

For inbound communications, MAC layer 44 accepts packets and transmits acknowledgement frames to indicate the packets were received. If packets are lost during transmission, the transmitting computer system does not receive an acknowledgement frame and the lost packets are automatically resent until an acknowledgement is received. Ethernet is a protocol that works at MAC layer 44.

RS 46 is situated between MAC layer 44 and XGMII 48. RS 46 operates as a command translator and maps the terminology and commands used in MAC layer 44 into electrical formats appropriate for entities in physical layer 1 at 40. In one embodiment, RS 46 adapts bit serial protocols of MAC layer 44 to parallel encodings of 10 Gbps physical layer devices 54.

XGMII 48 is situated between RS 46 and XAUI 50. XGMII 48 provides a standard interconnection between MAC layer 44 and physical layer devices 54. XGMII 48 isolates MAC layer 44 from physical layer devices 54 to enable MAC layer 44 to be used with various implementations of physical layer 1 at 40. XGMII 48 supports 10 Gbps operations with a 32 bit wide transmit data path and a 32 bit wide received bit path. XGMII 48 also includes 4 transmit control signals and a transmit clock, and 4 receive control signals and a receive clock to provide full duplex operation. Each direction of data transfer is independent and serviced by independent data, control, and clock signals. XGMII 48 uses signal levels compatible with digital ASIC processes.

XGMII 48 balances the need for media independence with the need for a simple and cost effective interface. The bus width and signaling rate are applicable to short distance integrated circuit chip-to-chip interconnections with printed circuit board trace lengths electrically limited to about 7 centimeters (cm). XGMII 48 is described in IEEE Std 802.3ae entitled "Part 3: Carrier Sense Multiple Access with Collision Detection (CSMA/CD) Access Method and Physical Layer Specifications, Amendment: Media Access Control (MAC) Perimeters, Physical Layers, and Management Perimeters for 10 Gb/s Operation."

XAUI 50 provides an interconnection between XGMII 48 and physical side XGMII 52. XAUI 50 can be used to extend the operational distance of the XGMII interface and reduce the number of interface signals. XAUI 50 can be used as an integrated circuit chip-to-chip interface with printed circuit board trace lengths of up to about 50 cm. XAUI 50 supports a 10 Gbps data rate between XGMII 48 and XGMII 52 via four differential pair transmit paths and four differential pair receive paths. Applications include extending the physical separation between MAC layer 44 and physical layer devices 54 in a 10 Gbps Ethernet system.

XAUI 50 can be inserted between RS 46 and physical layer devices 54 to transparently extend the physical reach of the XGMII interface and reduce the XGMII interface pin count. The XGMII interface is organized into four transmit lanes with each lane conveying a data octet on each edge of the associated clock, and four receive lanes with each lane conveying a data octet on each edge of the associated clock. Each of the four XGMII transmit lanes is transmitted across one of the four XAUI transmit paths and each of the four XGMII receive lanes is transmitted across one of the four XAUI receive paths. Each of the XAUI transmit paths and each of the XAUI receive paths is a serial, independent data path that uses low voltage swing differential signaling. Thus, XAUI 50 includes four differential pair transmit paths or eight transmit lines and four differential pair receive paths or eight receive lines. XAUI 50 is further described in IEEE Std 802.3ae, previously referenced herein.

Physical side XGMII 52 is similar to XGMII 48. Physical side XGMII 52 provides an interconnection between XAUI 50 and physical layer devices 54. Physical side XGMII 52 supports 10 Gpbs operation through a 32 bit wide transmit path and a 32 bit wide receive path. Physical side XGMII 52 provides four transmit control signals and a transmit clock and four receive control signals and a receive clock to provide full duplex operation. Each direction of data transfer is independent and serviced by data, control, and clock signals. The serial data from XAUI 50 is converted into 32 bit wide transmit and receive data streams transported through physical side XGMII 52. Physical layer devices 54 communicate with physical side XGMII 52 through the 32 bit wide transmit and receive data paths. Physical side XGMII 52 is further described in IEEE Std 802.3ae, previously referenced herein.

Physical layer devices 54 include physical coding sublayer (PCS) 60, physical medium attachment (PMA) 62, and physical medium dependent layer (PMD) 64. PCS 60 is positioned between physical side XGMII 52 and PMA 62 and is responsible for encoding data streams from MAC layer 44 for transmission through medium 58, and decoding data streams received through medium 58 for MAC layer 44. PMA 62 is situated between PCS 60 and PMD 64 and is responsible for serializing code groups into bit streams suitable for serial bit oriented physical devices, and vice versa. Also, PMA 62 synchronizes data for proper data decoding. PMD 64 is situated between PMA 62 and MDI 56 and is responsible for signal transmissions. PMD 64 can include an amplifier, modulation, and wave shaping. MDI 56 is a connector, where a different connector type is used for a different PMD 64 and/or a different physical medium 58.

In operation, each communicating user or program is at a communications system equipped with the seven layers of OSI model 20. In a given message transaction between users, data flows through application layer 7 at 28 to presentation layer 6 at 30 and down through the other layers of OSI model 20, including physical layer 1 at 40 of the transmitting computer system. The message is received at a receiving computer system and flows through physical layer 1 at 40 to data link layer 2 at 38 and up through the layers of OSI model 20, including application layer 7 at 28 of the receiving computer system and ultimately to the end user or program.

As the message is transmitted through data link layer 2 at 38, the message travels through LLC layer 42 and MAC layer 44. LLC layer 42 controls frame synchronization, flow control, and error checking and MAC layer 44 controls dividing the data meant for transmission into a series of packets formatted for the physical interface. MAC layer 44 also adds a unique MAC address to each packet identifying the computer system sending the transmission and an address that identifies the destination computer system.

Next, the message is transferred to RS 46 that provides a mapping between the signals provided by MAC layer 44 and the signals needed at XGMII 48. RS 46 operates as a command translator. XGMII 48 receives the message from RS 46 and transmits the message in a 32 bit wide transmit path. The 32 bit wide transmit path is converted into four serial data paths that are transmitted through XAUI 50 at a data rate of approximately 3.125 Gbps on each of the four data paths. The four serial data streams are converted into a 32 bit wide transmit path that is transported through physical side XGMII 52 to PCS 60. The message travels through PCS 60, PMA 62, and PMD 64 to MDI 56 and medium 58.

A receiving computer system, receives the message through medium 58 and the receiving computer systems MDI 56. The message is transported through the receiving computer systems PMD 64, PMA 62, and PCS 60 to the receiving computer systems physical side XGMII 52. The 32 bit wide data stream received at physical side XGMII 52 is converted into four serial data streams and transported through XAUI 50 at 3.125 Gbps on each of the four data streams to XGMII 48. The four serial data streams are converted into 32 bit wide data streams and transported through XGMII 48 to RS 46 that maps the received data to the receiving computer systems MAC layer 44. The receiving computer systems MAC layer 44 verifies the destination address of the message and transfers the message to the receiving computer systems LLC layer 42 and higher layers.

Figure 2:
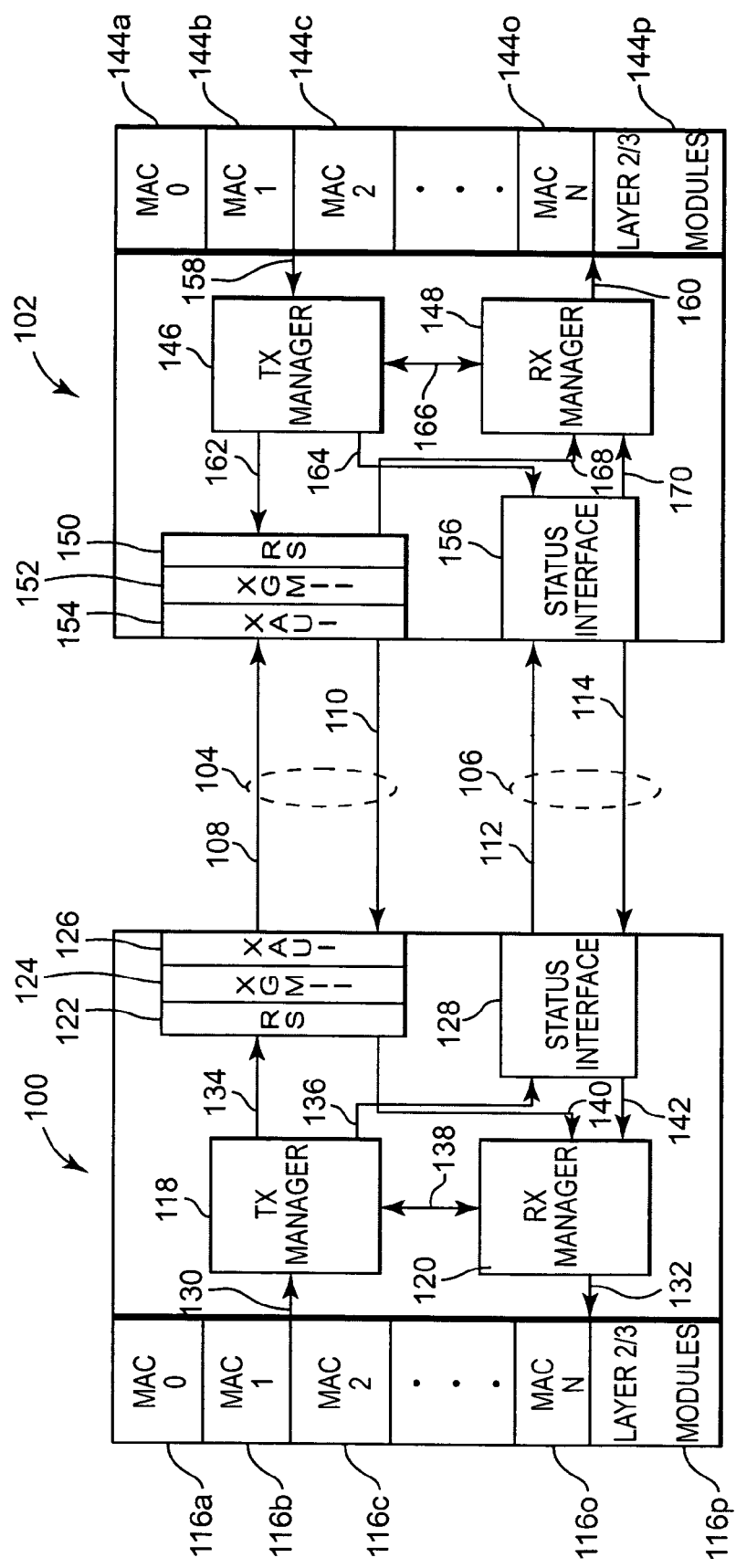
FIG. 2 is a diagram illustrating one embodiment of computer system devices in a communications system according to the present invention.

FIG. 2 is a diagram illustrating one embodiment of computer system devices 100 and 102 in a communications system according to the present invention. Computer system device 100, referred to as west device 100, communicates with computer system device 102, referred to as east device 102, via data paths 104 and 106. Data path 104 includes a west-to-east data path 108 and an east-to-west data path 110. Data path 106 includes a west-to-east data path 112 and an east-to-west data path 114. West-to-east data path 108 transfers bits at 10 Gbps and east-to-west data path 110 transfers bits at 10 Gbps. In other embodiments, west-to-east data path 108 and east-to-west data path 110 can transfer bits at any suitable frequency.

West device 100 includes MAC layers 116a-116o, OSI layer 2/3 modules 116p, transmit (TX) manager 118, receive (RX) manager 120, reconciliation sub-layer (RS) 122, XGMII 124, XAUI 126, and status interface 128. MAC layers 116a-116o and OSI layer 2/3 modules 116p are coupled with and communicate with TX manager 118 via transmit path 130 and with RX manager 120 via receive path 132. TX manager 118 is coupled with and communicates with RS 122 via packet transmit path 134 and with status interface 128 via segment data transmit path 136. Also, TX manager 118 is coupled with and communicates with RX manager 120 via status path 138. RX manager 120 is coupled with and communicates with RS 122 via packet receive path 140 and with status interface 128 via segment data receive path 142. Status interface 128 is coupled to west-to-east data path 112 and east-to-west data path 114. In addition, RS 122 is coupled with and communicates with XGMII 124 that is coupled with and communicates with XAUI 126 that is coupled to west-to-east data path 108 and east-to-west data path 110.

East device 102 includes MAC layers 144a-144o, OSI layer 2/3 modules 144p, TX manager 146, RX manager 148, RS 150, XGMII 152, XAUI 154, and status interface 156. MAC layers 144a-144o and OSI layer 2/3 modules 144p are coupled with and communicate with TX manager 146 via transmit path 158 and with RX manager 148 via receive path 160. TX manager 146 is coupled with and communicates with RS 150 via packet transmit path 162 and with status interface 156 via segment data transmit path 164. Also, TX manager 146 is coupled with and communicates with RX manager 148 via status path 166. RX manager 148 is coupled with and communicates with RS 150 via packet receive path 168 and with status interface 156 via segment data receive path 170. Status interface 156 is coupled to west-to-east data path 112 and east-to-west data path 114. In addition, RS 150 is coupled with and communicates with XGMII 152 that is coupled with and communicates with XAUI 154 that is coupled to west-to-east data path 108 and east-to-west data path 110. West device 100 and east device 102 communicate with one another at a bit rate of 10 Gbps through XAUI 126 and XAUI 154 via data paths 108 and 110.

Each of the MAC layers 116a-116o and 144a-144o is similar to MAC layer 44 (shown in FIG. 1) and is the lower portion of a data link layer 2 and one of the interface layers between an LLC layer and a physical layer 1. Each of the MAC layers 116a-116o and 144a-144o can be for a different computer system or a different group of computer systems. Also, each of the MAC layers 116a-116o and 144a-144o is responsible for controlling inbound and outbound communications between physical layer 1 and the higher layers of OSI model 20 (shown in FIG. 1).

Each of the MAC layers 116a-116o provides data payloads to TX manager 118. These data payloads include a unique MAC address identifying the computer system that originated the data payload and a unique MAC address identifying the destination channel or computer system. Each of the MAC layers 116a-116o receives data segments from RX manager 120. The received data segments are processed by the appropriate MAC layer(s) 116a-116o.

Each of the MAC layers 144a-144o provides data payloads to TX manager 146. These data payloads include a unique MAC address identifying the computer system that originated the data payload and a unique MAC address identifying the destination channel or computer system. Each of the MAC layers 144a-144o receives data segments from RX manager 148. The received data segments are processed by the appropriate MAC layer(s) 144a-144o.

OSI layer 2/3 modules 116p and 144p perform functions similar to each of the MAC layers 116a-116o and 144a-144o. OSI layer 2/3 modules 116p provide data payloads to TX manager 118 and receive data segments from RX manager 120. The received data segments are processed by the appropriate OSI layer 2/3 module(s) 116p. OSI layer 2/3 modules 144p provide data payloads to TX manager 146 and receive data segments from RX manager 148. The received data segments are processed by the appropriate OSI layer 2/3 module(s) 144p.

In west device 100, TX manager 118 is part of a MAC layer similar to MAC layer 44 (shown in FIG. 1). TX manager 118 receives data payloads from each of the MAC layers 116a-116o and OSI layer 2/3 modules 116p in west device 100 and divides the received data payloads into data segments. TX manager 118 inserts segments from different MAC layers 116a-116o and other OSI layer 2/3 modules 116p into a segment frame or packet that includes timeslots. Each timeslot in the segment packet carries a segment from one of the MAC layers 116a-116o or one of the OSI layer 2/3 modules 116p.

TX manager 118 compiles segment information about each of the segments in a segment packet. The segment information includes valid data length, segment status, information about the segments destination computer system, and the status of the receive buffer of the computer system that originated the segment. TX manager 118 inserts the segment information into timeslots in a segment status packet. Each timeslot in the segment status packet carries segment information about one segment in a corresponding segment packet. The sequence of segment information in the segment status packet corresponds to the sequence of segments in the corresponding segment packet.

TX manager 118 transmits the segment packet to RS 122 and the segment status packet to status interface 128. The process of inserting segments into timeslots of a segment packet and inserting segment information into timeslots in a corresponding segment status packet continues until the received data payloads are completely transmitted. TX manager 118 organizes the segment packets sequentially and presents them to RS 122 for transmission across west-to-east data path 108. Also, TX manager 118 organizes segment status packets sequentially and presents them to status interface 128 for transmission across west-to-east data path 112. The segment packet and corresponding segment status packet are transmitted at about the same time to arrive at east device 102 at about the same time.

In addition, TX manager 118 processes acknowledgement frames and controls access to RS 122 and status interface 128. TX manager 118 receives the status of receive buffers for computer systems in east device 102 through RX manager 120, which receives the receive buffer status of computer systems in east device 102 from segment status packets transmitted by east device 102. TX manager 118 controls transmitting segments to computer systems in east device 102 based on the status of the destination computer systems receive buffer.

RX manager 120 is part of a MAC layer similar to MAC layer 44 (shown in FIG. 1). RX manager 120 communicates with RS 122 and status interface 128 in west device 100 to receive segment packets from RS 122 and corresponding segment status packets from status interface 128. RX manager 120 communicates with each of the MAC layers 116a-

116*o* and OSI layer 2/3 modules 116*p* in west device 100 to transmit data segments to MAC layers 116*a*-116*o* and OSI layer 2/3 modules 116*p*.

RX manager 120 acquires segment information from the segment status packet for each segment in the corresponding segment packet. RX manager 120 uses the valid data length and segment status information to separate data segments from the segment packet. RX manager 120 uses the destination computer system information to transmit the segments to destination computer systems, such as MAC layers 116*a*-116*o* and OSI layer 2/3 modules 116*p* in west device 100. RX manager 120 also transmits an acknowledgement frame to TX manager 118 that transmits the acknowledgement frame back to east device 102. In addition, Rx manager 120 acquires the receive buffer status for the computer system that originated the corresponding segment and transmits the receive buffer status to TX manager 118. If the receive buffer status is normal, TX manager 118 continues transmitting segments to the computer system. If the receive buffer status is satisfy, TX manager 118 skips one transmission to the computer system to prevent overflowing the receive buffer for that MAC layer or OSI layer 2/3 module.

RS 122 is similar to RS 46 (shown in FIG. 1). RS 122 operates as a command translator between TX manager 118 and XGMII 124. RS 122 adapts bit serial protocols of TX manager 118 to the parallel encodings of XGMII 124. Also, RS 122 adapts the parallel encodings of XGMII 124 to bit serial protocols of RX manager 120.

XGMII 124 is similar to XGMII 48 (shown in FIG. 1). XGMII 124 supports 10 Gbps operation through a 32 bit wide transmit data path and a 32 bit wide receive data path. XGMII 124 includes 4 transmit control signals and a transmit clock, and 4 receive control signals and a receive clock to provide full duplex operation. Each direction of data transfer is independent and serviced by the independent data, control, and clock signals. XGMII 124 passes data and control signals between RS 122 and XAUI 126. The 32 bit wide transmit data and 4 transmit control signals are converted to four serial transmit paths in XAUI 126. The 32 bit wide receive data and 4 receive control signals are converted from four serial receive paths in XAUI 126. The conversions can be done in XGMII 124 and/or XAUI 126. In one embodiment, a 10 Gbps XGMII extender sub-layer (XGXS) is inserted between XGMII 124 and XAUI 126 to perform the conversions.

XAUI 126 is similar to XAUI 50 (shown in FIG. 1). XAUI 126 provides an interconnection between XGMII 124 and XAUI 154 in east device 102. XAUI 126 and XAUI 154 extend the operational distance of the interface to 50 cm and can be used as an integrated circuit to integrated circuit interface implemented with traces on a printed circuit board. XAUI 126 transmits data to XAUI 154 via west-to-east data path 108 and XAUI 126 receives data from XAUI 154 via east-to-west data path 110.

XAUI 126 supports the 10 Gbps data rate of XGMII 124 through four differential pair transmit paths and four differential pair receive paths. Each of the transmit paths and each of the receive paths is a serial, independent data path that uses low voltage swing differential signaling. Thus, XAUI 126 includes four differential pair transmit paths or eight transmit lines and four differential pair receive paths or eight receive lines. XGMII 124 is organized into four transmit lanes with each lane conveying a data octet on each edge of the associated clock, and four receive lanes with each lane conveying a data octet on each edge of the associated clock. Each of the four transmit lanes in XGMII 124 is transmitted across one of the four differential pair transmit paths in XAUI 126. Also, each of the four receive lanes in XGMII 124 is transmitted across one of the four differential pair receive paths in XAUI 126.

Status interface 128 provides an interconnection between TX manager 118 and status interface 156 in east device 102 and between RX manager 120 and status interface 156 in east device 102. Status interface 128 and status interface 156 can be used as an integrated circuit to integrated circuit interface implemented with traces on a printed circuit board. Status interface 128 and status interface 156 transmit and receive data in serial bit streams at less than 1 Gbps. Status interface 128 transmits data to status interface 156 via west-to-east data path 112 and status interface 128 receives data from status interface 156 via east-to-west data path 114.

Status interface 128 receives segment status packets from status interface 156 via east-to-west data path 114 and passes the received segment status packets to RX manager 120. Status interface 128 receives segment status packets from TX manager 118 and transmits the received segment status packets to status interface 156 via west-to-east data path 112. A segment status packet and the corresponding segment packet are transmitted at about the same time to arrive at east device 102 at about the same time. In one embodiment, each segment status packet can be transmitted slightly ahead of its corresponding segment packet to arrive at east device 102 slightly ahead of the segment packet.

In east device 102, TX manager 146 is part of a MAC layer similar to MAC layer 44 (shown in FIG. 1). TX manager 146 receives data payloads from each of the MAC layers 144*a*-144*o* and OSI layer 2/3 modules 144*p* in east device 102 and divides the received data payloads into data segments. TX manager 146 inserts segments from different MAC layers 144*a*-144*o* and other OSI layer 2/3 modules 144*p* into a segment frame or packet that includes timeslots. Each timeslot in the segment packet carries a segment from one of the MAC layers 144*a*-144*o* or one of the OSI layer 2/3 modules 144*p*.

TX manager 146 compiles segment information about each of the segments in a segment packet. The segment information includes valid data length, segment status, information about the segments destination computer system, and the status of the receive buffer of the computer system that originated the segment. TX manager 146 inserts the segment information into timeslots in a segment status packet. Each timeslot in the segment status packet carries segment information about one segment in a corresponding segment packet. The sequence of segment information in the segment status packet corresponds to the sequence of segments in the corresponding segment packet.

TX manager 146 transmits the segment packet to RS 148 and the segment status packet to status interface 156. The process of inserting segments into timeslots of a segment packet and inserting segment information into timeslots in a corresponding segment status packet continues until the received data payloads are completely transmitted. TX manager 146 organizes the segment packets sequentially and presents them to RS 148 for transmission across east-to-west data path 110. Also, TX manager 146 organizes segment status packets sequentially and presents them to status interface 156 for transmission across east-to-west data path 114. The segment packet and corresponding segment status packet are transmitted at about the same time and arrive at west device 100 at about the same time.

In addition, TX manager 146 processes acknowledgement frames and controls access to RS 150 and status interface 156. TX manager 146 receives the status of receive buffers for computer systems in west device 100 through RX manager 148, which receives the receive buffer status of computer systems in west device 100 from segment status packets transmitted by west device 100. TX manager 146 controls transmitting segments to computer systems in west device 100 based on the status of the destination computer systems receive buffer.

RX manager 148 is part of a MAC layer similar to MAC layer 44 (shown in FIG. 1). RX manager 148 communicates with RS 150 and status interface 156 in east device 102 to receive segment packets from RS 150 and corresponding segment status packets from status interface 156. RX manager 148 communicates with each of the MAC layers 144a-144o and other OSI layer 2/3 modules 144p in east device 102 to transmit segments to MAC layers 144a-144o and OSI layer 2/3 modules 144p.

RX manager 148 acquires segment information from the segment status packet for each segment in the corresponding segment packet. RX manager 148 uses the valid data length and segment status information to separate data segments from the segment packet. RX manager 148 uses the destination computer system information to transmit segments to destination computer systems, such as MAC layers 144a-144o and OSI layer 2/3 modules 144p in east device 102. RX manager 148 also transmits an acknowledgement frame to TX manager 146 that transmits the acknowledgement frame back to west device 100. In addition, RX manager 148 acquires the receive buffer status for the computer system that originated the corresponding segment and transmits the receive buffer status to TX manager 146. If the receive buffer status is normal, TX manager 146 continues transmitting segments to the computer system. If the receive buffer status is satisfy, TX manager 146 skips one transmission to the computer system to prevent overflowing the receive buffer for that MAC layer or OSI layer 2/3 module.

RS 150 is similar to RS 46 (shown in FIG. 1). RS 150 operates as a command translator between TX manager 146 and XGMII 152. RS 150 adapts bit serial protocols of TX manager 146 to the parallel encodings of XGMII 152. Also, RS 150 adapts the parallel encodings of XGMII 152 to bit serial protocols of RX manager 148.

XGMII 152 is similar to XGMII 48 (shown in FIG. 1). XGMII 152 supports 10 Gbps operation through a 32 bit wide transmit data path and a 32 bit wide receive data path. XGMII 152 includes 4 transmit control signals and a transmit clock, and 4 receive control signals and a receive clock to provide full duplex operation. Each direction of data transfer is independent and serviced by the independent data, control, and clock signals. XGMII 152 passes data and control signals between RS 150 and XAUI 154. The 32 bit wide transmit data and 4 transmit control signals are converted to four serial transmit paths in XAUI 154. The 32 bit wide receive data and 4 receive control signals are converted from four serial receive paths in XAUI 154. The conversions can be done in XGMII 152 and/or XAUI 154. In one embodiment, a 10 Gbps XGMII extender sub-layer (XGXS) is inserted between XGMII 152 and XAUI 154 to perform the conversions.

XAUI 154 is similar to XAUI 50 (shown in FIG. 1). XAUI 154 provides an interconnection between XGMII 152 and XAUI 126 in west device 100. XAUI 126 and XAUI 154 extend the operational distance of the interface to 50 cm and can be used as an integrated circuit to integrated circuit interface implemented with traces on a printed circuit board. XAUI 154 transmits data to XAUI 126 via east-to-west data path 110 and XAUI 154 receives data from XAUI 126 via west-to-east data path 108.

XAUI 154 supports the 10 Gbps data rate of XGMII 152 through four differential pair transmit paths and four differential pair receive paths. Each of the transmit paths and each of the receive paths is a serial, independent data path that uses low voltage swing differential signaling. Thus, XAUI 154 includes four differential pair transmit paths or eight transmit lines and four differential pair receive paths or eight receive lines. XGMII 152 is organized into four transmit lanes with each lane conveying a data octet on each edge of the associated clock, and four receive lanes with each lane conveying a data octet on each edge of the associated clock. Each of the four transmit lanes in XGMII 152 is transmitted across one of the four differential pair transmit paths in XAUI 154. Also, each of the four receive lanes in XGMII 152 is transmitted across one of the four differential pair receive paths in XAUI 154.

Status interface 156 provides an interconnection between TX manager 146 and status interface 128 in west device 100 and between RX manager 148 and status interface 128 in west device 100. Status interface 128 and status interface 156 can be used as an integrated circuit to integrated circuit interface implemented with traces on a printed circuit board. Status interface 128 and status interface 156 transmit and receive data in serial bit streams at less than 1 Gbps. Status interface 156 transmits data to status interface 128 via east-to-west data path 114 and status interface 156 receives data from status interface 128 via west-to-east data path 112.

Status interface 156 receives segment status packets from status interface 128 via west-to-east data path 112 and passes the received segment status packets to RX manager 148. Status interface 156 receives segment status packets from TX manager 146 and transmits the received segment status packets to status interface 128 via east-to-west data path 114. A segment status packet and the corresponding segment packet are transmitted at about the same time to arrive at west device 100 at about the same time. In one embodiment, each segment status packet can be transmitted slightly ahead of its corresponding segment packet to arrive at west device 100 slightly ahead of the segment packet.

In operation of transmissions from west device 100 to east device 102, TX manager 118 receives data payloads from MAC layers 116a-116o and OSI layer 2/3 modules 116p and divides the received data payloads into segments. TX manager 118 checks the receive buffer status for each segments destination computer system and inserts segments from different MAC layers 116a-116o and other OSI layer 2/3 modules 116p into timeslots in a segment packet. TX manager 118 only inserts segments with destination computer systems having a normal receive buffer status.

TX manager 118 compiles segment information about each of the segments in the segment packet and inserts the segment information into timeslots in a segment status packet that corresponds to the segment packet. The sequence of timeslots in the segment status packet corresponds to the sequence of segments in the segment packet. TX manager 118 presents segment packets sequentially to RS 122 for transmission across west-to-east data path 108 and TX manager 118 presents segment status packets sequentially to status interface 128 for transmission across west-to-east data path 112.

RS 122 maps each of the segment packets received from TX manager 118 to a format compatible with XGMII 124. RS 122 passes each of the segment packets to XGMII 124 that passes each of the segment packets to XAUI 126. XAUI 126 transmits each of the segment packets to XAUI 154 via west-to-east data path 108.

Status interface 128 receives each of the segment status packets and transmits each of the segment status packets to status interface 156 via west-to-east data path 112. Each segment packet and corresponding segment status packet arrives at east device 102 at about the same time. The process of inserting segments into timeslots of a segment packet and inserting segment information into timeslots in a corresponding segment status packet continues until the received data payloads are completely transmitted.

XAUI 154 in east device 102 receives segment packets from XAUI 126, and status interface 156 in east device 102 receives the corresponding segment status packets from status interface 128. XAUI 154 passes received segment packets to RX manager 148 through XGMII 152 and RS 150. Status interface 156 passes received segment status packets to RX manager 148.

RX manager 148 divides out segment information from the segment status packet and uses the valid data length and segment status to separate segments from the corresponding segment packet. Valid data are transmitted from RX manager 148 to destination MAC layers 144a-144o and OSI layer 2/3 modules 144p and an acknowledgment frame is passed to TX manager 146. Also, RX manager 148 passes the receive buffer status for the computer systems that originated the segments to TX manager 146.

In operation of transmissions from east device 102 to west device 100, TX manager 146 receives data payloads from MAC layers 144a-144o and OSI layer 2/3 modules 144p and divides the received data payloads into segments. TX manager 146 checks the receive buffer status for each segments destination computer system and inserts segments from different MAC layers 144a-144o and other OSI layer 2/3 modules 144p into timeslots in a segment packet. TX manager 146 only inserts segments with destination computer systems having a normal receive buffer status.

TX manager 146 compiles segment information about each of the segments in the segment packet and inserts the segment information into timeslots in a segment status packet that corresponds to the segment packet. The sequence of timeslots in the segment status packet corresponds to the sequence of segments in the segment packet. TX manager 146 presents segment packets sequentially to RS 150 for transmission across east-to-west data path 110 and TX manager 146 presents segment status packets sequentially to status interface 128 for transmission across east-to-west data path 114.

RS 150 maps each of the segment packets received from TX manager 146 to a format compatible with XGMII 152. RS 150 passes each of the segment packets to XGMII 152 that passes each of the segment packets to XAUI 154. XAUI 154 transmits each of the segment packets to XAUI 126 via east-to-west data path 110.

Status interface 156 receives each of the segment status packets and transmits each of the segment status packets to status interface 128 via east-to-west data path 114. Each segment packet and corresponding segment status packet arrives at west device 100 at about the same time. The process of inserting segments into timeslots of a segment packet and inserting segment information into timeslots in a corresponding segment status packet continues until the received data payloads are completely transmitted.

XAUI 126 in west device 100 receives segment packets from XAUI 154, and status interface 128 in west device 100 receives the corresponding segment status packets from status interface 156. XAUI 126 passes received segment packets to RX manager 120 through XGMII 124 and RS 122. Status interface 128 passes received segment status packets to RX manager 120.

RX manager 120 divides out segment information from the segment status packet and uses the valid data length and segment status to separate segments from the corresponding segment packet. Valid data are transmitted from RX manager 120 to destination computer systems and an acknowledgement frame is passed to TX manager 118. Also, TX manager 118 passes the receive buffer status for the computer systems that originated the segments to TX manager 118.

Figure 3:
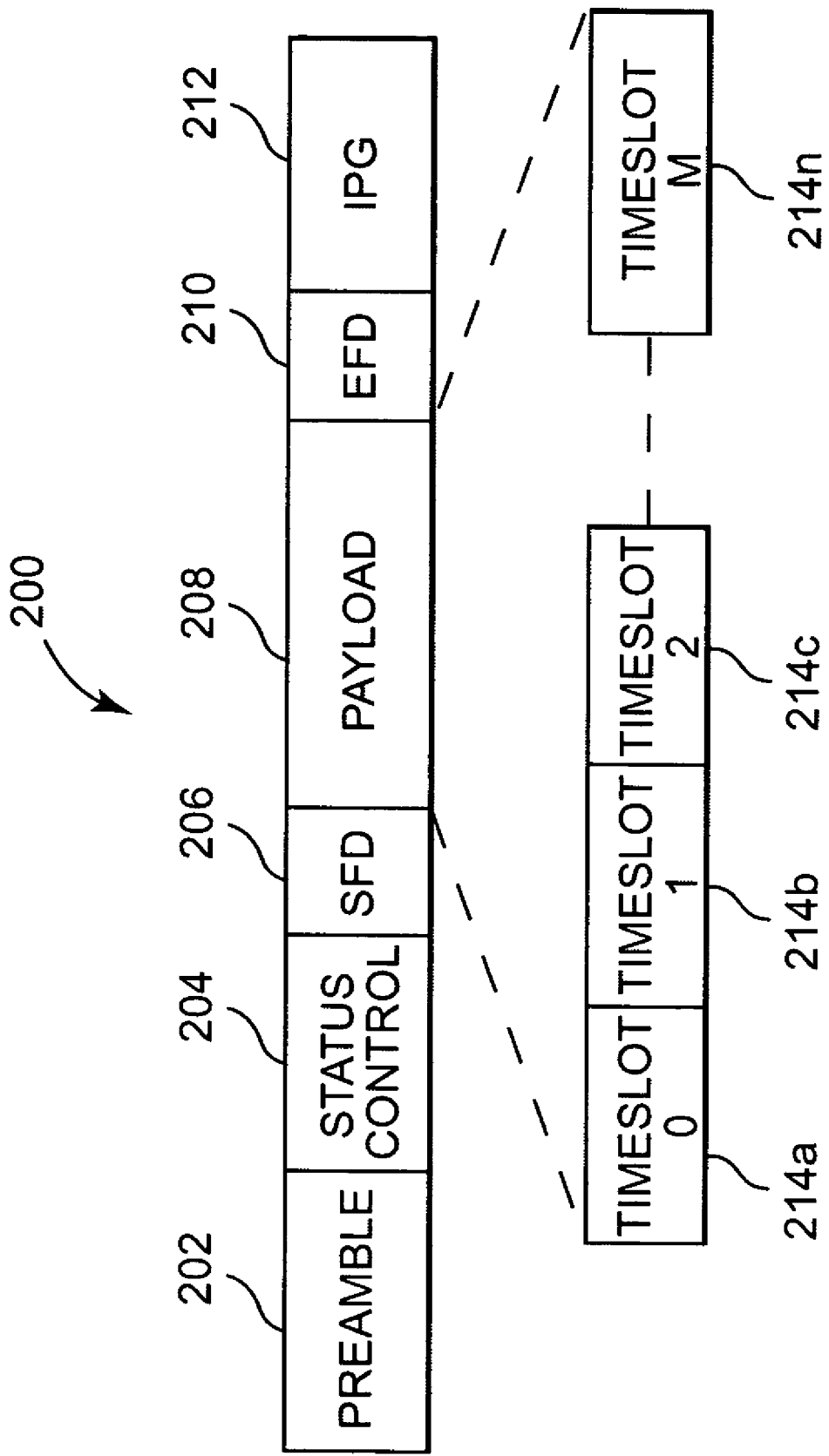
FIG. 3 is a diagram illustrating one embodiment of a segment packet.

FIG. 3 is a diagram illustrating one embodiment of a segment packet 200. Segment packet 200 includes a preamble 202, a status control field 204, a start of frame delimiter (SFD) 206, a payload 208, an end of frame delimiter (EFD) 210, and an inter packet gap (IPG) 212. Segment packet 200 is communicated between west device 100 and east device 102 via XAUI 126 and XAUI 154 (shown in FIG. 2).

Preamble 202 is a 6 byte field that begins a segment packet transmission. Preamble 202 is initiated by a TX manager, such as TX manager 118 and TX manager 146, and begins as six bytes in the following hexadecimal bit pattern: 0xAA AA AA AA AA AA. A reconciliation sub-layer, such as RS 122 and RS 150, converts the first byte of 0xAA into a one byte start control character that indicates the beginning of a segment packet. During reception, a reconciliation sub-layer converts the start control character back into 0xAA. In one embodiment, preamble 202 is a 7 byte field. In other embodiments, preamble 202 can be any suitable length.

Status control field 204 follows preamble 202 and is used to exchange synchronization messages between devices, such as west device 100 and east device 102. Status control field 204 can carry a scan table synchronization byte that indicates the first segment in the first timeslot of payload 208 corresponds to the first entry in the indicated scan table. The scan tables include a sequence of destination computer systems or MAC layers and OSI layer 2/3 modules and identical scan tables are stored in paired devices, such as west device 100 and east device 102. The destination information for a segment, which is included in the corresponding segment status packet, is a scan table identifier that increments a pointer into the identified scan table. The pointer points to the destination computer system for the segment. The scan table synchronization byte ensures that pointers into matching scan tables in different devices are synchronized to ensure that segments are sent to the correct destination computer system. Status control field 204 can also carry a link capacity adjustment scheme (LCAS) byte that indicates which LCAS to use. In one embodiment, each device includes two LCAS configuration sets, one active and one shadow LCAS. A swap between the active and the shadow LCAS can be done remotely through status control field 204. In one embodiment, status control field 204 is a 1 byte field. In other embodiments, status control field 204 can be any suitable length.

SFD 206 follows status control field 204 and indicates the start of payload 208. In one embodiment, SFD 206 is a 1 byte field. In other embodiments, SFD 206 can be any suitable length. In one embodiment, SFD 206 is a hexadecimal 0xAB. In other embodiments, SFD 206 can be any suitable bit pattern.

Payload 208 follows SFD 206 and includes M+1 timeslots 214a-214n that can include segments from different MAC layers or OSI layer 2/3 modules. Each of the timeslots 214a-214n carries a segment from a MAC layer or OSI layer 2/3 module. In one embodiment, M equals 511 and payload 208 includes 512 timeslots. In one embodiment, each of the timeslots 214a-214n is 16 bytes long. In one embodiment, M equals 511 and each of the timeslots 214a-214n is 16 bytes long, such that payload 208 includes 8192 bytes. In other embodiments, M can be any suitable number and each timeslot can be any suitable length, such as 8 bytes or 32 bytes long.

EFD 210 follows payload 208 and indicates the end of payload 208. EFD 210 can be any suitable bit pattern. In one embodiment, EFD 210 is a 1 byte field. In other embodiments, EFD 210 can be any suitable length.

IPG 212 follows EFD 210 and precedes the next segment packet preamble. IPG 212 inserts a delay or time gap between segment packets. This delay provides inter-packet recovery time for OSI layers and the physical medium. In one embodiment, IPG 212 is 11 bytes. In other embodiments, IPG 212 can be any suitable length.

Figure 4:
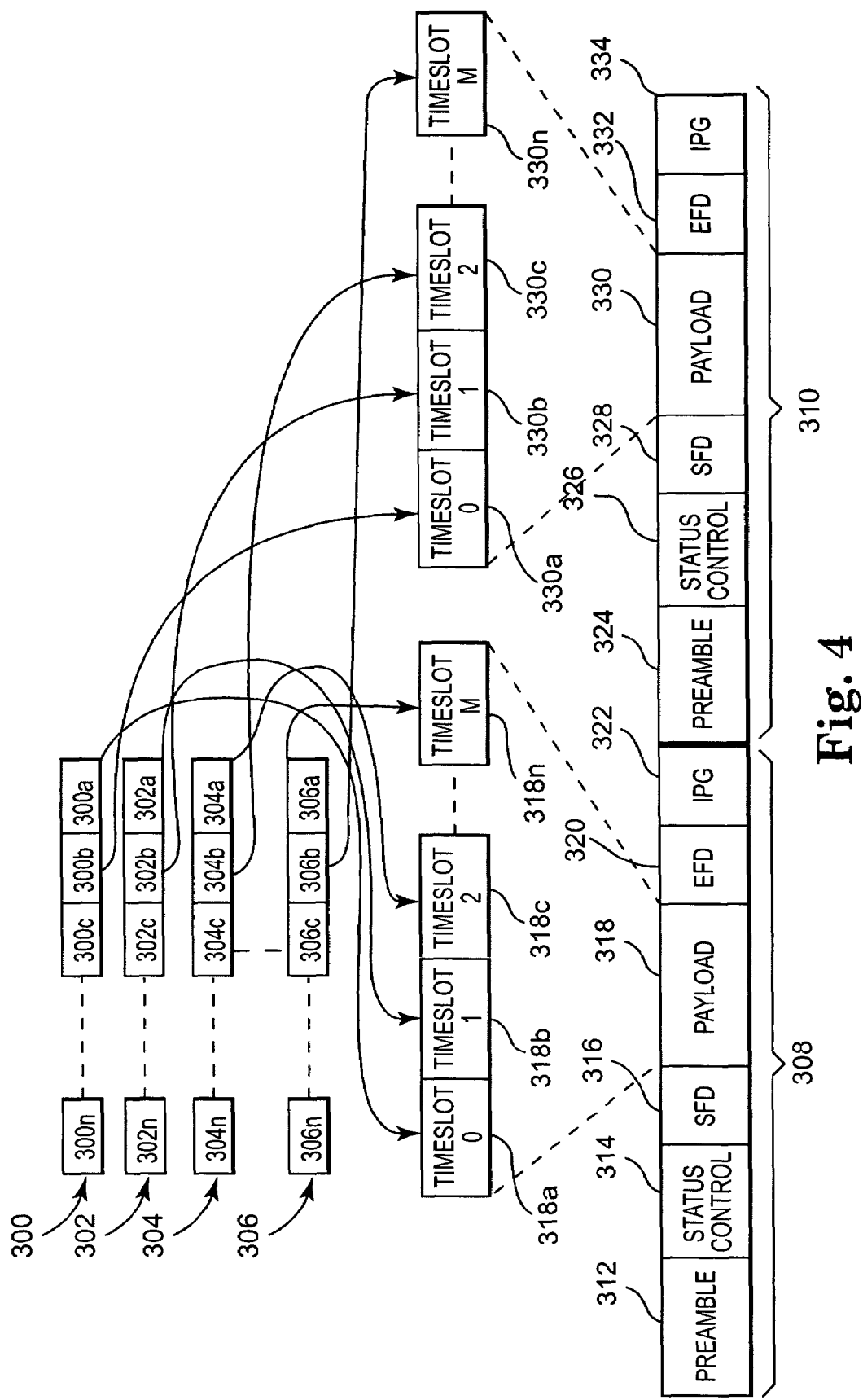
FIG. 4 is a diagram illustrating one example of segmenting and framing data payloads into segment packets in one embodiment of a device.

FIG. 4 is a diagram illustrating one example of segmenting and framing data payloads 300, 302, and 304 to 306 into segment packets 308 and 310 in one embodiment of a device, such as west device 100 or east device 102 (shown in FIG. 2). Each of the data payloads 300, 302, and 304 to 306 originates from one of the MAC layers or OSI layer 2/3 modules in the device and each of the data payloads 300, 302, and 304 to 306 is received by the TX manager in the device. In west device 100, each of the data payloads 300, 302, and 304 to 306 originates from one of the MAC layers 116*a*-116*o* or OSI layer 2/3 modules 116*p* and is received by TX manager 118. In east device 102, each of the data payloads 300, 302, and 304 to 306 originates from one of the MAC layers 144*a*-144*o* or OSI layer 2/3 modules 144*p* and is received by TX manager 146. In one embodiment, at least two of the data payloads 300, 302, and 304 to 306 originate from a different one of the MAC layers or OSI layer 2/3 modules. In one embodiment, each of the data payloads 300, 302, and 304 to 306 originates from a different one of the MAC layers or OSI layer 2/3 modules.

The TX manager divides data payloads 300, 302, and 304 to 306 into segments. Data payload 300 is divided into segments 300*a*-300*n*, data payload 302 is divided into segments 302*a*-302*n*, data payload 304 is divided into segments 304*a*-304*n*, and data payload 306 is divided into segments 306*a*-306*n*. Data payloads between data payload 304 and data payload 306 are also divided into segments. In one embodiment, each of the data payloads 300, 302, and 304 to 306 is divided into segments that are each 16 bytes long. In other embodiments, each of the data payloads 300, 302, and 304 to 306 is divided into segments that are any suitable length.

Each of the segment packets 308 and 310 is similar to segment packet 200 of FIG. 3. Segment packet 308 includes preamble 312, status control field 314, SFD 316, payload 318, EFD 320, and IPG 322. Segment packet 310 includes preamble 324, status control field 326, SFD 328, payload 330, EFD 332, and IPG 334. Each of the components of segment packets 308 and 310 is similar to the corresponding component in segment packet 200 described herein. The TX manager frames segments 300*a*-300*n*, 302*a*-302*n*, and 304*a*-304*n* to 306*a*-306*n* into payloads of segment packets, such as payloads 318 and 330 of segment packets 308 and 310.

Payload 318 includes M+1 timeslots 318*a*-318*n* and payload 330 includes M+1 timeslots 330*a*-330*n*. Each of the timeslots 318*a*-318*n* and 330*a*-330*n* can carry one of the segments 300*a*-300*n*, 302*a*-302*n*, and 304*a*-304*n* to 306*a*-306*n*. In one embodiment, M equals 511 and each of the payloads 318 and 330 includes 512 timeslots. In one embodiment, each of the timeslots 318*a*-318*n* and 330*a*-330*n* is 16 bytes long. In one embodiment, M equals 511 and each of the timeslots 318*a*-318*n* and 330*a*-330*n* is 16 bytes long, such that each of the payloads 318 and 330 includes 8192 bytes. In other embodiments, M can be any suitable number and each timeslot can be any suitable length, such as 8 bytes or 32 bytes long.

The TX manager inserts segments 300*a*-300*n*, 302*a*-302*n*, and 304*a*-304*n* to 306*a*-306*n* into timeslots, such as timeslots 318*a*-318*n* and 330*a*-330*n*. In one embodiment, the TX manager inserts one of the segments 300*a*-300*n*, 302*a*-302*n*, and 304*a*-304*n* to 306*a*-306*n* into one of the timeslots 318*a*-318*n* and 330*a*-330*n*. In one embodiment, the TX manager can insert more than one of the segments 300*a*-300*n*, 302*a*-302*n*, and 304*a*-304*n* to 306*a*-306*n* into one of the timeslots 318*a*-318*n* and 330*a*-330*n* and the multiple segments in one timeslot are from the same MAC layer or OSI layer 2/3 module.

The TX manager inserts segment 300*a* into timeslot 0 at 318*a*, segment 302*a* into timeslot 1 at 318*b*, segment 304*a* into timeslot 2 at 318*c*, and on, up to segment 306*a* into timeslot M at 318*n*. After payload 318 is framed, segment packet 308 can be transmitted to another device. Next, the TX manager inserts segment 300*b* into timeslot 0 at 330*a*, segment 302*b* into timeslot 1 at 330*b*, segment 304*b* into timeslot 2 at 330*c*, and on, up to segment 306*b* into timeslot M at 330*n*. After payload 330 is framed, segment packet 310 can be transmitted to another device. Framing continues until all of the segments 300*a*-300*n*, 302*a*-302*n*, and 304*a*-304*n* to 306*a*-306*n* in data payloads 300, 302, and 304 to 306 have been inserted into segment packets, such as segment packets 308 and 310.

Each of the segment packets 308 and 310 is transmitted to another device and received by an RX manager, such as RX manager 120 or RX manager 148. The RX manager RX divides out segment information from the corresponding segment status packet and uses the valid data length and segment status to separate segments 300*a*-300*n*, 302*a*-302*n*, and 304*a*-304*n* to 306*a*-306*n* from segment packets, such as segment packets 308 and 310. Segments 300*a*-300*n*, 302*a*-302*n*, and 304*a*-304*n* to 306*a*-306*n* are transmitted from the RX manager to destination MAC layers and other OSI layer 2/3 modules.

Figure 5:
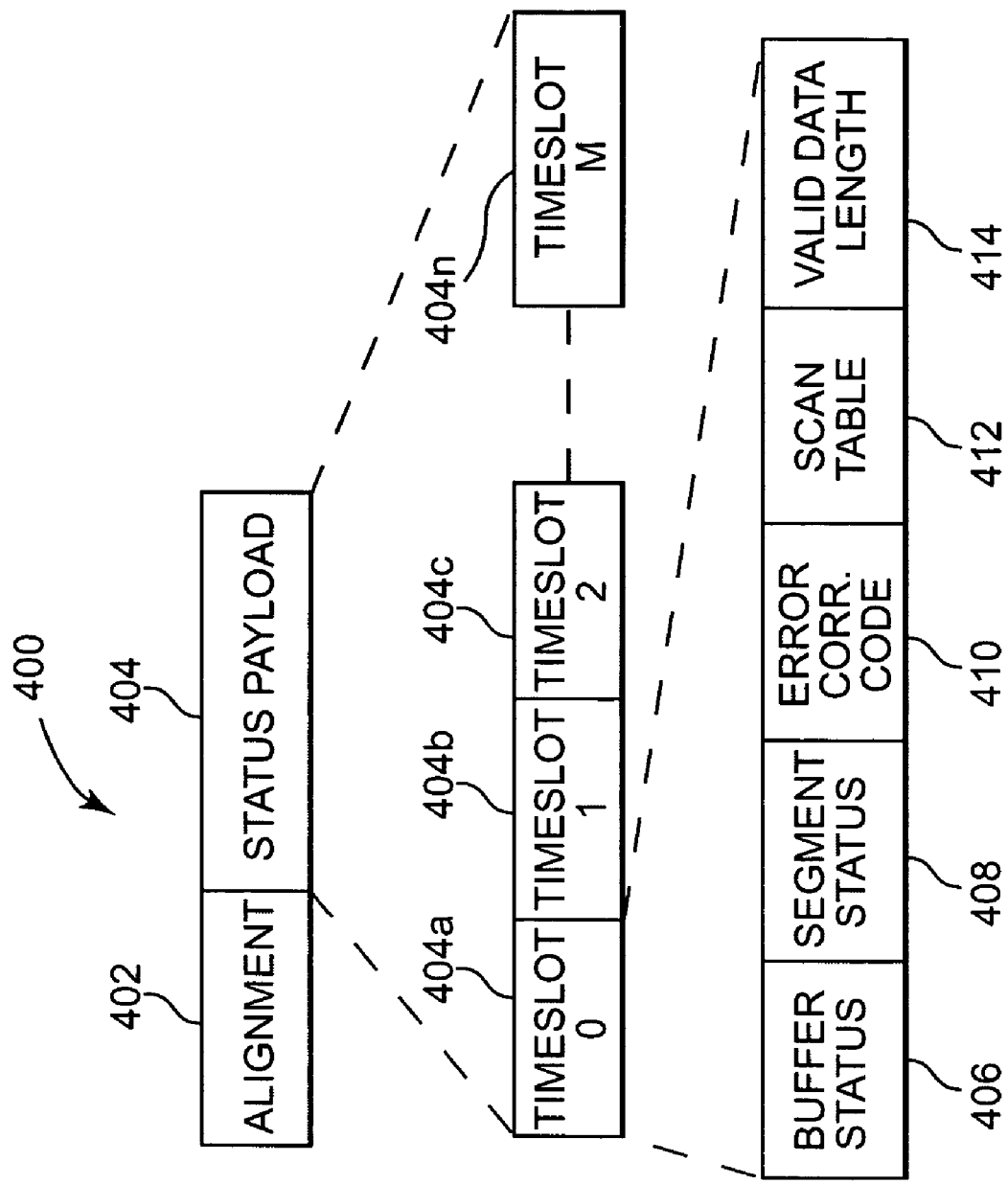
FIG. 5 is a diagram illustrating one embodiment of a segment status packet.

FIG. 5 is a diagram illustrating one embodiment of a segment status packet 400. The segment status packet 400 includes a frame alignment field 402 and a status payload 404. Each segment status packet, such as segment status packet 400, corresponds to one segment packet, such as segment packet 308 or segment packet 310 (shown in FIG. 4). The segment status packet 400 carries segment information about each of the segments in the corresponding segment packet. Segment status packet 400 and the corresponding segment packet are transmitted at about the same time to arrive at the receiving device at about the same time. Segment status packet 400 is communicated between west device 100 and east device 102 via status interface 128 and status interface 156 (shown in FIG. 2). In one embodiment, segment packets, such as segment packets 308 and 310, are transmitted at 10 Gbps and segment status packets, such as segment status packet 400, are transmitted at 1 Gbps.

Frame alignment field 402 is a 2 byte (16 bit) field that begins a transmission of a segment status packet 400. Frame alignment field 402 is used for synchronization of the segment status packet 400 at the receiving device. The 2 byte hexadecimal bit pattern is 0xFC 03 transmitted from left to right, where the last eight bits are the complement of the first eight bits and mark the start of status payload 404. The hexadecimal sequence 0xFC is repeated continuously where bit stuffing is needed to synchronize segment status packet 400 with its corresponding segment packet and to maintain a designated bit rate, such as 1 Gbps. In other embodiments, frame alignment field 402 can be any suitable length. Also, in other embodiments, frame alignment field 402 can be any suitable bit pattern.

Status payload 404 follows frame alignment field 402 and includes M+1 timeslots 404*a*-404*n*. In one embodiment, M equals 511 and status payload 404 includes 512 timeslots. In one embodiment, each of the timeslots 404a-404n is 10 bits long. In another embodiment, each of the timeslots 404a-404n could be greater than 10 bits. In one embodiment, M equals 511 and each of the timeslots 404a-404n is 10 bits long, such that status payload 404 includes 640 bytes (5120 bits). In other embodiments, M can be any suitable number and each timeslot can be any suitable length.

The timeslots 404a-404n correspond one to one with timeslots in the corresponding segment packet. For example, if segment packet 308 (shown in FIG. 4) is the corresponding segment packet for segment status packet 400, timeslots 404a-404n correspond one to one with timeslots 318a-318n in segment packet 308. Timeslot 404a carries segment information about the segment in timeslot 318a, timeslot 404b carries segment information about the segment in timeslot 318b, timeslot 404c carries segment information about the segment in timeslot 318c, and so on, up to timeslot 404n that carries segment information about the segment in timeslot 318n. In one embodiment with segment packet 308 being much longer than segment status packet 400, the segment packet 308 is transmitted at 10 Gbps and segment status packet 400 is transmitted at 1 Gbps and each of the timeslots 318a-318n in payload 318 is received at the receiving device at about the same time as each of the corresponding timeslots 404a-404n in status payload 404.

Each of the timeslots 404a-404n includes a receive buffer status field 406, a segment status field 408, an error correction code field 410, a scan table identification field 412, and a valid data length field 414. In one embodiment, each of the timeslots 404a-404n is 10 bits long with a receive buffer status field 406 of 1 bit, segment status field 408 of 2 bits, error correction code field 410 of 1 bit, scan table identification field 412 of 2 bits, and valid data length field 414 of 4 bits.

The receive buffer status field 406 indicates the receive buffer status for the MAC layer or OSI layer 2/3 module that originated the segment in the corresponding segment packet timeslot. The receive buffer status is transmitted from the RX manager to the TX manager and can be either satisfy or normal. If the receive buffer status field 406 indicates that the receive buffer status is satisfy, the TX manager skips a transmission of one or more segments to the receive buffer MAC layer or OSI layer 2/3 module. If the receive buffer status field 406 indicates that the receive buffer is normal, the TX manager continues to transmit segments to the receive buffer. In one embodiment, the receive buffer status field is 1 bit. In other embodiments, the receive buffer status field can be any suitable length.

The scan table identification field 412 and the error correction code field 410 are used to indicate the MAC layer or OSI layer 2/3 module that is the destination for the segment in the corresponding time slot. The scan table identification field 412 indicates the scan table that contains the identity of the destination MAC layer or OSI layer 2/3 module. The scan table identification field 412 carries a scan table identifier that increments a pointer into the identified scan table. The pointer points to the MAC layer or OSI layer 2/3 module that is the destination for the corresponding segment. To ensure that matching scan tables are kept synchronized, error correction code field 410 provides error correction code data that is used to correct errors in the scan table identification field 412. In one embodiment, the scan table identification field 412 is 2 bits long and the error correction code field is 1 bit long. In other embodiments, the scan table identification field 412 can be any suitable length and the error correction code field 410 can be any suitable length.

The segment status field 408 provides status about the segment in the corresponding timeslot. The segment status field 408 indicates whether the segment in the corresponding timeslot is errored, the end of a data payload from one of the MAC layers or OSI layer 2/3 modules, all valid, or all invalid. The segment status field 408 and valid data length field 414 are used to separate valid bytes from invalid bytes and to indicate the beginning of a new data payload from the originating MAC layer or OSI layer 2/3 module. In addition, in certain situations, the valid data length field 414 is used for other purposes, such as indicating the status of a transit queue or carrying control commands to the receiving device. In one embodiment, the segment status field 408 is 2 bits. In one embodiment, the valid data length field 414 is 4 bits. In other embodiments, the segment status field 408 can be any suitable length and the valid data length field 414 can be any suitable length.

If the segment status field 408 indicates that the segment in the corresponding timeslot is errored, the valid data length field 414 indicates the number of valid bytes in the corresponding timeslot. The transmitting TX manager inserts a status byte in the corresponding timeslot of the segment packet after the last valid byte and if the inserted status byte indicates a new data payload, the remaining bytes in the corresponding timeslot are valid. If the status byte does not indicate a new data payload, the remaining bytes are invalid.

If the segment status field 408 indicates the segment in the corresponding timeslot is the end of a data payload, the valid data length field 414 indicates the number of valid bytes in the data payload. The transmitting TX manager inserts a status byte in the corresponding timeslot after the last valid byte in the data payload and if the status byte indicates a new data payload, the remaining bytes in the corresponding timeslot are valid. If the status byte does not indicate a new data payload, the remaining bytes are invalid.

If the segment status field 408 indicates that all bytes in the timeslot are valid, the valid data length field 414 can be used for other purposes, such as indicating the status of a transit queue or carrying control commands to the receiving device. Also, if the segment status field 408 indicates that all bytes in the timeslot are invalid, the valid data length field 414 can be used for other purposes, such as indicating the status of a transit queue or carrying control commands to the receiving device.

Figure 6:
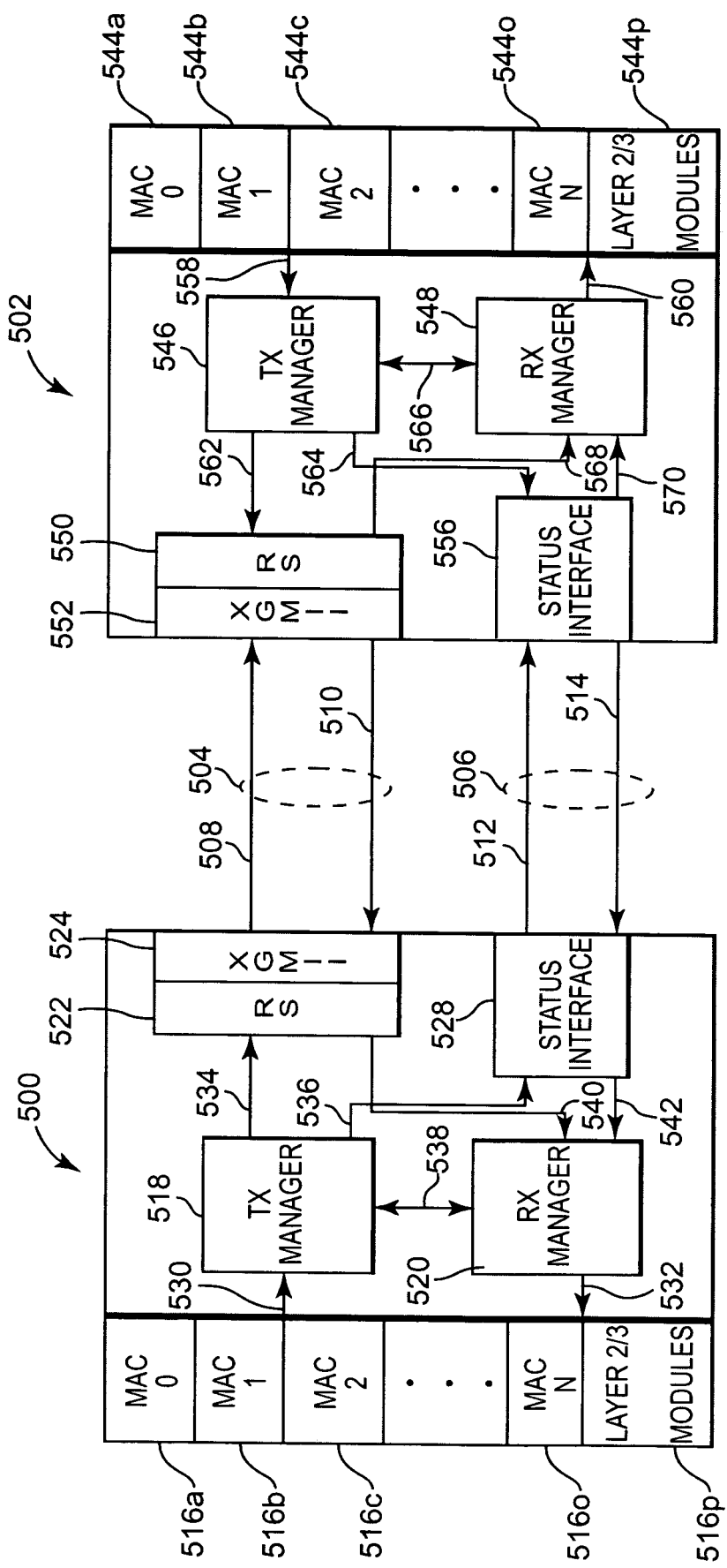
FIG. 6 is a diagram illustrating one embodiment of computer system devices in a communication system according to the present invention.

FIG. 6 is a diagram illustrating one embodiment of computer system devices 500 and 502 in a communications system according to the present invention. Computer system device 500, referred to as west device 500, is similar to west device 100 (shown in FIG. 2) and computer system device 502, referred to as east device 502, is similar to east device 102 (shown in FIG. 2). West device 500 communicates with east device 502 via data paths 504 and 506. Data path 504 includes a west-to-east data path 508 and an east-to-west data path 510. Data path 506 includes a west-to-east data path 512 and an east-to-west data path 514.

West device 500 includes MAC layers 516a-516o, OSI layer 2/3 modules 516p, TX manager 518, RX manager 520, RS 522, XGMII 524, and status interface 528. West device 500 does not include an XAUI, such as XAUI 126 (shown in FIG. 2). MAC layers 516a-516o and OSI layer 2/3 modules 516p are coupled with and communicate with TX manager 518 via transmit path 530 and with RX manager 520 via receive path 532. TX manager 518 is coupled with and communicates with RS 522 via packet transmit path 534 and with status interface 528 via segment data transmit path 536. Also, TX manager 518 is coupled with and communicates with RX manager 520 via status path 538. RX manager 520 is coupled with and communicates with RS 522 via packet receive path 540 and with status interface 528 via segment data receive path 542. Status interface 528 is coupled to west-to-east data path 512 and east-to-west data path 514. RS 522 is coupled with and communicates with XGMII 524, which is coupled to west-to-east data path 508 and east-to-west data path 510.

East device 502 includes MAC layers 544a-544o, OSI layer 2/3 modules 544p, TX manager 546, RX manager 548, RS 550, XGMII 552, and status interface 556. East device 502 does not include an XAUI, such as XAUI 154 (shown in FIG. 2). MAC layers 544a-544o and OSI layer 2/3 modules 544p are coupled with and communicate with TX manager 546 via transmit path 558 and with RX manager 548 via receive path 560. TX manager 546 is coupled with and communicates with RS 550 via packet transmit path 562 and with status interface 556 via segment data transmit path 564. Also, TX manager 546 is coupled with and communicates with RX manager 548 via status path 566. RX manager 548 is coupled with and communicates with RS 550 via packet receive path 568 and with status interface 556 via segment data receive path 570. Status interface 556 is coupled to west-to-east data path 512 and east-to-west data path 514. RS 550 is coupled with and communicates with XGMII 552, which is coupled to west-to-east data path 508 and east-to-west data path 510.

The components in west device 500 are similar to components in west device 100 (shown in FIG. 2). MAC layers 516a-516o are similar to MAC layers 116a-116o and OSI layer 2/3 modules 516p are similar to OSI layer 2/3 modules 116p. Also, TX manager 518 is similar to TX manager 118 and RX manager 520 is similar to RX manager 120. In addition, RS 522 is similar to RS 122 and XGMII 524 is similar to XGMII 124. Also, status interface 528 is similar to status interface 128. The components in west device 500 function and operate together similar to the components in west device 100.

The components in east device 502 are similar to components in east device 102 (shown in FIG. 2). MAC layers 544a-544o are similar to MAC layers 144a-144o and OSI layer 2/3 modules 544p are similar to OSI layer 2/3 modules 144p. Also, TX manager 546 is similar to TX manager 146 and RX manager 548 is similar to RX manager 148. In addition, RS 550 is similar to RS 150 and XGMII 552 is similar to XGMII 152. Also, status interface 556 is similar to status interface 156. The components in east device 502 function and operate together similar to the components in east device 102.

West device 500 and east device 502 communicate through status interface 528 and status interface 556 via data paths 512 and 514 similar to the way west device 100 and east device 102 communicate through status interface 128 and status interface 156 via data paths 112 and 114. West device 500 and east device 502 do not communicate through XAUI components. Instead, west device 500 and east device 502 communicate with one another at a bit rate of 10 Gbps through XGMII 524 and XGMII 552 via data paths 508 and 510.

XGMII 524 supports 10 Gbps operation through a 32 bit wide transmit data path and a 32 bit wide receive data path. XGMII 524 organizes the 32 bit wide transmit data path into four transmit lanes with each lane conveying a data octet on each edge of the associated clock, and XGMII 524 organizes the 32 bit wide receive data path into four receive lanes with each lane conveying a data octet on each edge of the associated clock. Also, XGMII 524 includes 4 transmit control signal paths and a transmit clock path, and 4 receive control signal paths and a receive clock path to provide full duplex operation. Each direction of data transfer is independent and serviced by the independent data, control, and clock signals.

XGMII 552 supports 10 Gbps operation through a 32 bit wide transmit data path and a 32 bit wide receive data path. XGMII 552 organizes the 32 bit wide transmit data path into four transmit lanes with each lane conveying a data octet on each edge of the associated clock, and XGMII 552 organizes the 32 bit wide receive data path into four receive lanes with each lane conveying a data octet on each edge of the associated clock. Also, XGMII 552 includes 4 transmit control signal paths and a transmit clock path, and 4 receive control signal paths and a receive clock path to provide full duplex operation. Each direction of data transfer is independent and serviced by the independent data, control, and clock signals.

In operation, XGMII 524 and XGMII 552 communicate segment packets, such as segment packets 308 and 310 (shown in FIG. 4), via west-to-east data path 508 and east-to-west data path 510. Also, status interface 528 and status interface 556 communicate segment status packets, such as segment status packet 400 (shown in FIG. 5), via west-to-east data path 512 and east-to-west data path 514.

Figure 7:
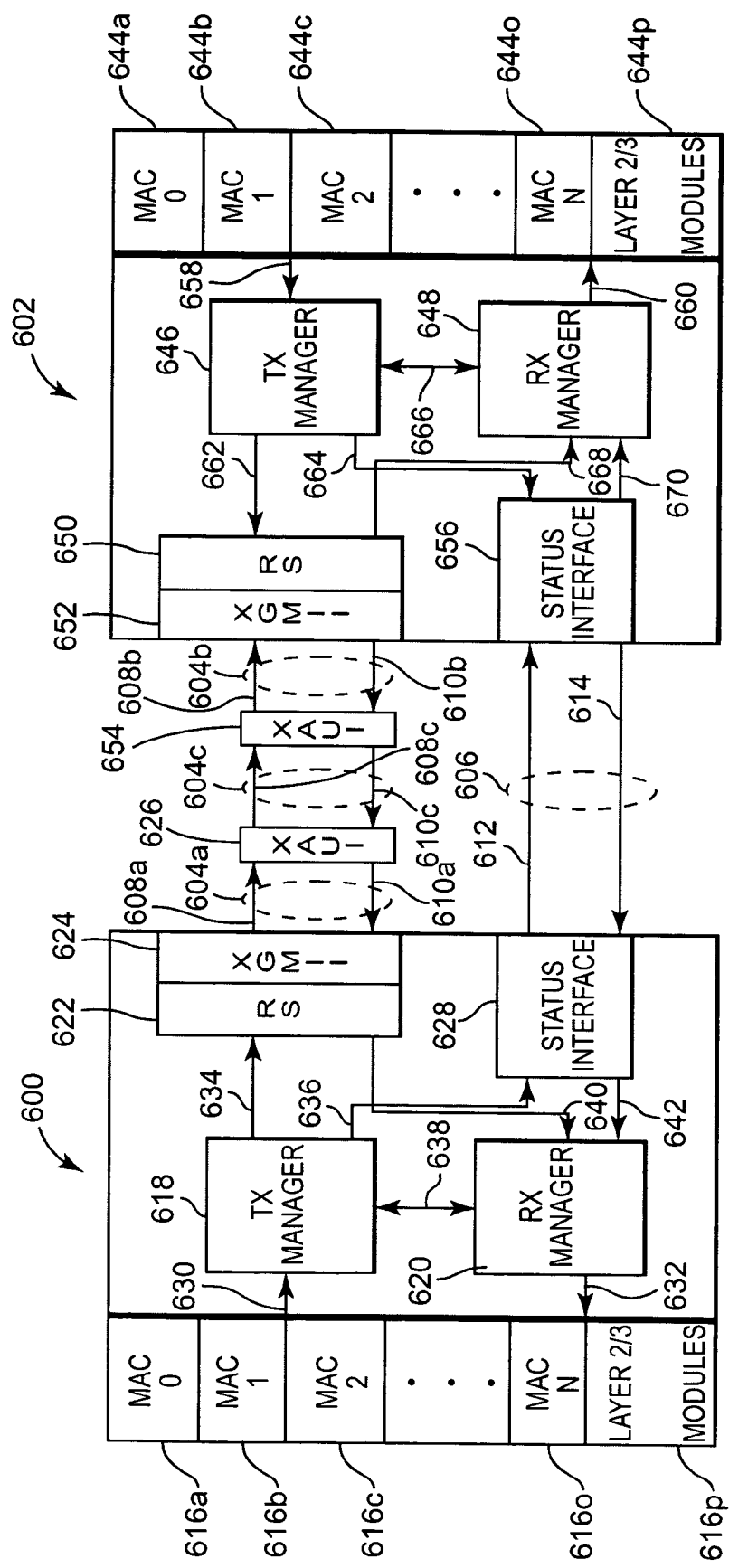
FIG. 7 is a diagram illustrating one embodiment of computer system devices and external XAUIs in a communications system according to the present invention.

FIG. 7 is a diagram illustrating one embodiment of computer system devices 600 and 602 and XAUIs 626 and 654 in a communications system according to the present invention. Computer system device 600, referred to as west device 600, is similar to west device 100 (shown in FIG. 2) and computer system device 602, referred to as east device 602, is similar to east device 102 (shown in FIG. 2). West device 600 does not include an XAUI. Instead, XAUI 626 is located external to west device 600 and functions and operates similar to XAUI 126 (shown in FIG. 2). East device 602 does not include an XAUI. Instead, XAUI 654 is located external to east device 602 and functions and operates similar to XAUI 154 (shown in FIG. 2). West device 600 communicates with XAUI 626 via data path 604a that includes a west-to-east data path 608a and an east-to-west data path 610a. East device 602 communicates with XAUI 654 via data path 604b that includes a west-to-east data path 608b and an east-to-west data path 610b. XAUI 626 and XAUI 654 communicate via data path 604c that includes a west-to-east data path 608c and an east-to-west data path 610c. Also, west device 600 communicates with east device 602 via data path 606 that includes a west-to-east data path 612 and an east-to-west data path 614.

West device 600 includes MAC layers 616a-616o, OSI layer 2/3 modules 616p, TX manager 618, RX manager 620, RS 622, XGMII 624, and status interface 628. West device 600 does not include an XAUI, such as XAUI 126 (shown in FIG. 2). MAC layers 616a-616o and OSI layer 2/3 modules 616p are coupled with and communicate with TX manager 618 via transmit path 630 and with RX manager 620 via receive path 632. TX manager 618 is coupled with and communicates with RS 622 via packet transmit path 634 and with status interface 628 via segment data transmit path 636. Also, TX manager 618 is coupled with and communicates with RX manager 620 via status path 638. RX manager 620 is coupled with and communicates with RS 622 via packet receive path 640 and with status interface 628 via segment data receive path 642. Status interface 628 is coupled to west-to-east data path 612 and east-to-west data path 614. RS 622 is coupled with and communicates with XGMII 624, which is coupled to west-to-east data path 608a and east-to-west data path 610a.

East device 602 includes MAC layers 644a-644o, OSI layer 2/3 modules 644p, TX manager 646, RX manager 648, RS 650, XGMII 652, and status interface 656. East device 602 does not include an XAUI, such as XAUI 154 (shown in FIG. 2). MAC layers 644a-644o and OSI layer 2/3 modules 644p are coupled with and communicate with TX manager 646 via transmit path 658 and with RX manager 648 via receive path 660. TX manager 646 is coupled with and communicates with RS 650 via packet transmit path 662 and with status interface 656 via segment data transmit path 664. Also, TX manager 646 is coupled with and communicates with RX manager 648 via status path 666. RX manager 648 is coupled with and communicates with RS 650 via packet receive path 668 and with status interface 656 via segment data receive path 670. Status interface 656 is coupled to west-to-east data path 612 and east-to-west data path 614. RS 650 is coupled with and communicates with XGMII 652, which is coupled to west-to-east data path 608b and east-to-west data path 610b.

The components in west device 600 are similar to components in west device 100 (shown in FIG. 2). MAC layers 616a-616o are similar to MAC layers 116a-116o and OSI layer 2/3 modules 616p are similar to OSI layer 2/3 modules 116p. Also, TX manager 618 is similar to TX manager 118 and RX manager 620 is similar to RX manager 120. In addition, RS 622 is similar to RS 122 and XGMII 624 is similar to XGMII 124. Also, status interface 628 is similar to status interface 128. The components in west device 600 function and operate together similar to the components in west device 100.

The components in east device 602 are similar to components in east device 102 (shown in FIG. 2). MAC layers 644a-644o are similar to MAC layers 144a-144o and OSI layer 2/3 modules 644p are similar to OSI layer 2/3 modules 144p. Also, TX manager 646 is similar to TX manager 146 and RX manager 648 is similar to RX manager 148. In addition, RS 650 is similar to RS 150 and XGMII 652 is similar to XGMII 152. Also, status interface 656 is similar to status interface 156. The components in east device 602 function and operate together similar to the components in east device 102.

West device 600 and east device 602 communicate through status interface 628 and status interface 656 via data paths 612 and 614 similar to the way west device 100 and east device 102 communicate through status interface 128 and status interface 156 via data paths 112 and 114. West device 600 and east device 602 communicate with one another at a bit rate of 10 Gbps through XAUI 626 and XAUI 654.

XGMII 624 supports 10 Gbps operation through a 32 bit wide transmit data path and a 32 bit wide receive data path. XGMII 624 organizes the 32 bit wide transmit data path into four transmit lanes with each lane conveying a data octet on each edge of the associated clock, and XGMII 624 organizes the 32 bit wide receive data path into four receive lanes with each lane conveying a data octet on each edge of the associated clock. Also, XGMII 624 includes 4 transmit control signal paths and a transmit clock path, and 4 receive control signal paths and a receive clock path to provide full duplex operation. Each direction of data transfer is independent and serviced by the independent data, control, and clock signals.

XGMII 624 passes data and control signals between RS 622 and XAUI 626. The 32 bit wide transmit data and 4 transmit control signals are converted to four serial transmit paths in XAUI 626. The 32 bit wide receive data and 4 receive control signals are converted from four serial receive paths in XAUI 626. These conversions can be done in XGMII 624 and/or XAUI 626. In one embodiment, a 10 Gbps XGMII extender sub-layer (XGXS) is inserted between XGMII 624 and XAUI 626 to perform the conversions.

XGMII 652 supports 10 Gbps operation through a 32 bit wide transmit data path and a 32 bit wide receive data path. XGMII 652 organizes the 32 bit wide transmit data path into four transmit lanes with each lane conveying a data octet on each edge of the associated clock, and XGMII 652 organizes the 32 bit wide receive data path into four receive lanes with each lane conveying a data octet on each edge of the associated clock. Also, XGMII 652 includes 4 transmit control signal paths and a transmit clock path, and 4 receive control signal paths and a receive clock path to provide full duplex operation. Each direction of data transfer is independent and serviced by the independent data, control, and clock signals.

XGMII 652 passes data and control signals between RS 650 and XAUI 654. The 32 bit wide transmit data and 4 transmit control signals are converted to four serial transmit paths in XAUI 654. The 32 bit wide receive data and 4 receive control signals are converted from four serial receive paths in XAUI 654. These conversions can be done in XGMII 652 and/or XAUI 654. In one embodiment, a 10 Gbps XGMII extender sub-layer (XGXS) is inserted between XGMII 652 and XAUI 654 to perform the conversions.

XAUI 626 and XAUI 654 communicate to extend the operational distance of the interface to 50 cm and can be used as an integrated circuit to integrated circuit interface implemented with traces on a printed circuit board. XAUI 626 transmits data to XAUI 654 via west-to-east data path 108c and XAUI 626 receives data from XAUI 654 via east-to-west data path 110c.

XAUI 626 and XAUI 654 support the 10 Gbps data rate of XGMII 624 and XGMII 652 through four differential pair transmit paths and four differential pair receive paths. Each of the transmit paths and each of the receive paths is a serial, independent data path that uses low voltage swing differential signaling. Thus, XAUI 626 and XAUI 654 include four differential pair transmit paths or eight transmit lines and four differential pair receive paths or eight receive lines.

In operation, XGMII 624, XAUI 626, XAUI 654, and XGMII 652 communicate segment packets, such as segment packets 308 and 310 (shown in FIG. 4). Also, status interface 628 and status interface 656 communicate segment status packets, such as segment status packet 400 (shown in FIG. 5), via west-to-east data path 612 and east-to-west data path 614.

Figure 8:
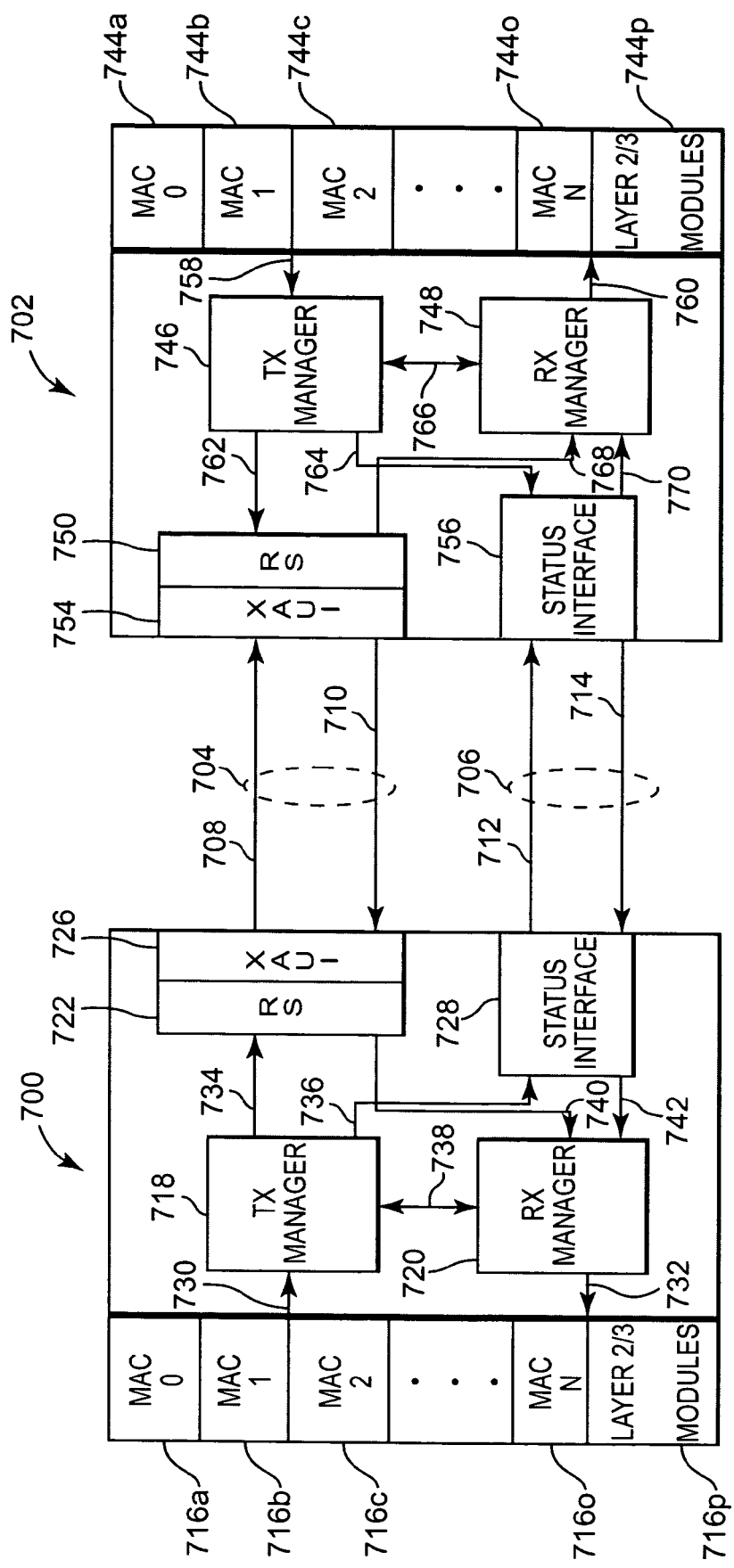
FIG. 8 is a diagram illustrating another embodiment of computer system devices in a communications system according to the present invention.

FIG. 8 is a diagram illustrating one embodiment of computer system devices 700 and 702 in a communications system according to the present invention. Computer system device 700, referred to as west device 700, is similar to west device 100 (shown in FIG. 2) and computer system device 702, referred to as east device 702, is similar to east device 102 (shown in FIG. 2). West device 700 communicates with east device 702 via data paths 704 and 706. Data path 704 includes a west-to-east data path 708 and an east-to-west data path 710. Data path 706 includes a west-to-east data path 712 and an east-to-west data path 714.

West device 700 includes MAC layers 716a-716o, OSI layer 2/3 modules 716p, TX manager 718, RX manager 720, RS 722, XAUI 726, and status interface 728. West device 700 does not include an XGMII, such as XGMII 124 (shown in FIG. 2). MAC layers 716a-716o and OSI layer 2/3 modules 716p are coupled with and communicate with TX manager 718 via transmit path 730 and with RX manager 720 via receive path 732. TX manager 718 is coupled with and communicates with RS 722 via packet transmit path 734 and with status interface 728 via segment data transmit path 736. Also, TX manager 718 is coupled with and communicates with RX manager 720 via status path 738. RX manager 720 is coupled with and communicates with RS 722 via packet receive path 740 and with status interface 728 via segment data receive path 742. Status interface 728 is coupled to west-to-east data path 712 and east-to-west data path 714. RS 722 is coupled with and communicates with XAUI 726, which is coupled to west-to-east data path 708 and east-to-west data path 710.

East device 702 includes MAC layers 744a-744o, OSI layer 2/3 modules 744p, TX manager 746, RX manager 748, RS 750, XAUI 754, and status interface 756. East device 702 does not include an XGMII, such as XGMII 152 (shown in FIG. 2). MAC layers 744a-744o and OSI layer 2/3 modules 744p are coupled with and communicate with TX manager 746 via transmit path 758 and with RX manager 748 via receive path 760. TX manager 746 is coupled with and communicates with RS 750 via packet transmit path 762 and with status interface 756 via segment data transmit path 764. Also, TX manager 746 is coupled with and communicates with RX manager 748 via status path 766. RX manager 748 is coupled with and communicates with RS 750 via packet receive path 768 and with status interface 756 via segment data receive path 770. Status interface 756 is coupled to west-to-east data path 712 and east-to-west data path 714. RS 750 is coupled with and communicates with XAUI 754, which is coupled to west-to-east data path 708 and east-to-west data path 710.

The components in west device 700 are similar to components in west device 100 (shown in FIG. 2). MAC layers 716a-716o are similar to MAC layers 116a-116o and OSI layer 2/3 modules 716p are similar to OSI layer 2/3 modules 116p. Also, TX manager 718 is similar to TX manager 118 and RX manager 720 is similar to RX manager 120. In addition, RS 722 is similar to RS 122 and XAUI 726 is similar to XAUI 126, with the exception that RS 722 maps signals to XAUI 726 instead of an XGMII, such as XGMII 124. Also, status interface 728 is similar to status interface 128. The components in west device 700 function and operate together similar to the components in west device 100.

The components in east device 702 are similar to components in east device 102 (shown in FIG. 2). MAC layers 744a-744o are similar to MAC layers 144a-144o and OSI layer 2/3 modules 744p are similar to OSI layer 2/3 modules 144p. Also, TX manager 746 is similar to TX manager 146 and RX manager 748 is similar to RX manager 148. In addition, RS 750 is similar to RS 150 and XAUI 754 is similar to XAUI 154, with the exception that RS 750 maps signals to XAUI 754 instead of an XGMII, such as XGMII 152. Also, status interface 756 is similar to status interface 156. The components in east device 702 function and operate together similar to the components in east device 102.

West device 700 and east device 702 communicate through status interface 728 and status interface 756 via data paths 712 and 714 similar to the way west device 100 and east device 102 communicate through status interface 128 and status interface 156 via data paths 112 and 114. West device 700 and east device 702 do not communicate through XGMII components. Instead, west device 700 and east device 702 communicate with one another at a bit rate of 10 Gbps through XAUI 726 and XAUI 754 via data paths 708 and 710.

XAUI 726 and XAUI 754 communicate to extend the operational distance of the interface to 50 cm and can be used as an integrated circuit to integrated circuit interface implemented with traces on a printed circuit board. XAUI 726 transmits data to XAUI 754 via west-to-east data path 108 and XAUI 726 receives data from XAUI 754 via east-to-west data path 110.

XAUI 726 and XAUI 754 support a 10 Gbps data rate through four differential pair transmit paths and four differential pair receive paths. Each of the transmit paths and each of the receive paths is a serial, independent data path that uses low voltage swing differential signaling. Thus, XAUI 726 and XAUI 754 include four differential pair transmit paths or eight transmit lines and four differential pair receive paths or eight receive lines.

In operation, XAUI 726 and XAUI 754 communicate segment packets, such as segment packets 308 and 310 (shown in FIG. 4), via west-to-east data path 708 and east-to-west data path 710. Also, status interface 728 and status interface 756 communicate segment status packets, such as segment status packet 400 (shown in FIG. 5), via west-to-east data path 712 and east-to-west data path 714.

Figure 9:
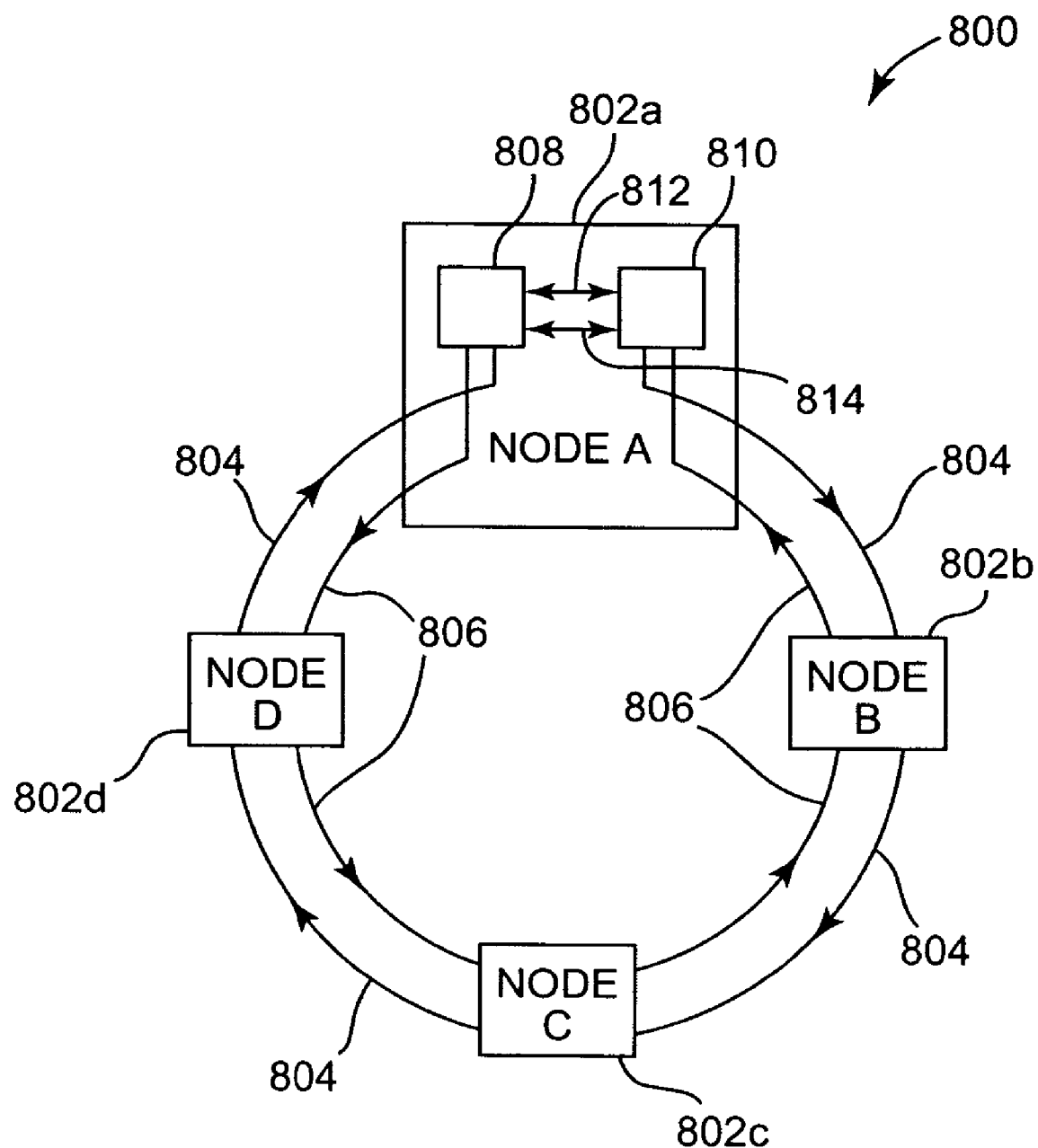
FIG. 9 is a diagram illustrating a resilient packet ring (RPR) network.

FIG. 9 is a diagram illustrating a resilient packet ring (RPR) network 800. RPR 800 includes nodes A-D at 802a-802d, respectively, a clockwise communications path 804, and a counter clockwise communications path 806. Each of the nodes A-D at 802a-802d is communicatively coupled to clockwise communications path 804 and to counter clockwise communications path 806.

Node A at 802a includes a west device 808 and an east device 810. The west device 808 and east device 810 are a pair of computer system devices similar to any of the west device and east device pairs described herein, such as west device 100 and east device 102 (shown in FIG. 2), west device 500 and east device 502 (shown in FIG. 6), west device 600 and east device 602 (including external XAUI components 626 and 654 shown in FIG. 7), and west device 700 and east device 702 (shown in FIG. 8). In one embodiment, each of the nodes B-D 802b-802d is similar to node A at 802a. In other embodiments, each of the nodes A-D 802a-802d can be any suitable west device and east device pairing.

West device 808 is communicatively coupled to clockwise communications path 804 and counter clockwise communications path 806. East device 810 is communicatively coupled to clockwise communications path 804 and counter clockwise communications path 806. Also, west device 808 is communicatively coupled to east device 810 via segment packet data path 812 and segment status packet data path 814. West device 808 and east device 810 communicate segment packets at 10 Gbps via segment packet data path 812. West device 808 and east device 810 communicate segment status packets at about 1 Gbps via segment status packet data path 814.

In one example operation, west device 808 receives data from other computer systems via clockwise communications path 804. West device 808 consumes the data and/or transmits the data to another computer system. To transmit the data to another computer system, west device 808 transmits the data to east device 810 via segment packet data path 812 and segment status packet data path 814. East device 810 forwards the data to other computer systems via clockwise communications path 804. In one embodiment, east device 810 can also consume the data and/or transmit the data on the counter clockwise communications path 806. To transmit the data on the counter clockwise communications path 806, east device 810 transmits the data back to west device 808 via segment packet data path 812 and segment status packet data path 814. West device 808 then forwards the data on counter clockwise communications path 806 to other computer systems.

In another example operation, east device 810 receives data from other computer systems via counter clockwise communications path 806. East device 810 consumes the data and/or transmits the data to another computer system. To transmit the data to another computer system, east device 810 transmits the data to west device via segment packet data path 812 and segment status packet data path 814. West device 808 forwards the data to other computer systems via counter clockwise communications path 806. In one embodiment, west device 808 can also consume the data and/or transmit the data via clockwise communications path 804. To transmit the data on clockwise communications path 804, west device 808 transmits the data back to east device 810 via segment packet data path 812 and segment status packet data path 814. East device 810 then forwards the data on clockwise communications path 804 to other computer systems.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A communications system, comprising:
    a segmenting mechanism configured to receive a plurality of payloads and divide each of the received payloads into segments;
    a framing mechanism configured to insert at least one of the segments from each of the plurality of payloads into a packet;
    a first interface configured to transmit the packet; and
    a second interface configured to transmit segment information about the segments in the packet, wherein each of the segments is inserted into timeslots in a segment status packet having a corresponding data length and segment status transmitted by the second interface, wherein the first interface comprises a first ten gigabit media independent interface in communication with a first ten gigabit attachment unit interface and the second interface comprises a second ten gigabit media independent interface in communication with a second ten gigabit attachment unit interface, wherein the first ten gigabit attachment unit interface transmits the packet to the second ten gigabit attachment unit interface.

2. The communications system of claim 1, wherein the segments in the packet are transmitted in a first sequence and the corresponding data length and segment status are transmitted in a second sequence that matches one to one with the first sequence.

3. The communications system of claim 1, wherein each of the segments in the packet arrives at a receiving device at about the same time as the corresponding data length and segment status arrives at the receiving device.

4. The communications system of claim 1, wherein the second interface is configured to transmit identifiers that identify destination systems for the segments in the packet, wherein each of the segments in the packet has a corresponding identifier.

5. The communications system of claim 4, wherein the identifiers are scan table identifiers.

6. The communications system of claim 4, wherein the second interface is configured to transmit receive buffer status values.

7. The communications system of claim 1, wherein each of the segments in the packet is inserted in a timeslot of the packet and each of the timeslots of the packet corresponds to a destination system.

8. The communications system of claim 1, wherein the first interface operates at up to ten gigabits per second.

9. The communications system of claim 8, wherein the first interface includes at least one of a media independent interface and an attachment unit interface.

10. The communications system of claim 1, wherein the first interface operates at a bit frequency of at least ten gigabits per second.

11. The communications system of claim 10, wherein the first interface includes at least one of a media independent interface and an attachment unit interface.

12. A communications system, comprising:
    layers configured to provide payloads;
    a manager configured to receive the payloads and divide each of the received payloads into segments and to insert the segments from different layers into timeslots in a packet and compile segment information about each of the segments inserted in the timeslots;
    a first interface configured to transmit the packet;
    a second interface configured to receive the packet;
    a third interface configured to transmit the segment information; and
    a fourth interface configured to receive the segment information, wherein each segment is inserted into timeslots in a segment status packet having a corresponding data length and segment status transmitted by the third interface, wherein the first interface comprises a first ten gigabit media independent interface in communication with a first ten gigabit attachment unit interface and the second interface comprises a second ten gigabit media independent interface in communication with a second ten gigabit attachment unit interface, wherein the first ten gigabit attachment unit interface transmits the packet to the second ten gigabit attachment unit interface.

13. The communications system of claim 12, wherein the first interface and the second interface communicate bi-directionally and the third interface and the fourth interface communicate bi-directionally.

14. The communications system of claim 12, wherein the first interface comprises a first ten gigabit media independent interface and the second interface comprises a second ten gigabit media independent interface.

15. The communications system of claim 12, wherein the first interface comprises a first ten gigabit attachment unit interface and the second interface comprises a second ten gigabit attachment unit interface.

16. The communications system of claim 12, wherein the first interface and the third interface are on one side of a communications interface, the second interface and the fourth interface are on another side of the communications interface, and the communications interface is part of a resilient packet ring network.

17. A communications system, comprising:
    means for segmenting a plurality of payloads into segments;
    means for framing at least one of the segments from each of the plurality of payloads into a packet;
    means for transmitting the packet; and
    means for transmitting segment information about the segments in the packet, wherein the means for transmitting segment information about the segments in the packet comprises:
    means for inserting each segment into timeslots in a segment status packet having a corresponding data length and segment status, wherein the means for transmitting the packet comprises a first ten gigabit media independent interface in communication with a first ten gigabit attachment unit interface and wherein the means for transmitting segment information about the segments in the packet further comprises a second ten gigabit media independent interface in communication with a second ten gigabit attachment unit interface, wherein the first ten gigabit attachment unit interface transmits the packet to the second ten gigabit attachment unit interface.

18. The communications system of claim 17, wherein the means for transmitting segment information about the segments in the packet comprises:
    means for transmitting identifiers that identify destination systems for the segments in the packet.

19. The communications system of claim 18, wherein the means for transmitting identifiers comprises:

means for transmitting scan table identifiers that increment a pointer to a synchronized scan table.

20. The communications system of claim 17, wherein the means for transmitting segment information about the segments in the packet comprises:
means for transmitting receive buffer status values.

21. A method for communicating data, comprising:
receiving a plurality of payloads;
dividing each of the received payloads into segments;
inserting at least one of the segments from each of the plurality of payloads into a packet;
transmitting the packet through a first interface; and
transmitting segment information through a second interface, wherein transmitting the packet comprises transmitting the segments in the packet in a first sequence and transmitting segment information comprises:
inserting each segment into timeslots in a segment status packet
transmitting data length and segment status of each of the segments in the packet; and
transmitting the data length and segment status of the segments in a second sequence that corresponds one to one with the first sequence, wherein the first interface comprises a first ten gigabit media independent interface in communication with a first ten gigabit attachment unit interface and the second interface comprises a second ten gigabit media independent interface in communication with a second ten gigabit attachment unit interface, wherein the first ten gigabit attachment unit interface transmits the packet to the second ten gigabit attachment unit interface.

22. The method of claim 21, comprising:
receiving one of the segments in the packet; and
receiving the data length and segment status that corresponds to the one of the segments in the packet at about the same time as the one of the segments is received.

23. The method of claim 21, comprising:
transmitting receive buffer status values through the second interface.

24. The method of claim 21, comprising:
transmitting identification values that identify destination systems for each of the segments in the packet through the second interface.

25. The method of claim 24, wherein transmitting identification values comprises:
transmitting scan table identifiers that increment a pointer to a synchronized scan table.

* * * * *